United States Patent
Shen et al.

(10) Patent No.: US 11,201,815 B2
(45) Date of Patent: Dec. 14, 2021

(54) METHOD AND SYSTEM FOR SELECTING LEAST-LOADED ROUTE BASED ON NAIVE BAYES CLASSIFIER

(71) Applicant: SOOCHOW UNIVERSITY, Suzhou (CN)

(72) Inventors: Gangxiang Shen, Suzhou (CN); Longfei Li, Suzhou (CN); Ya Zhang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 604 days.

(21) Appl. No.: 16/317,063

(22) PCT Filed: Jan. 24, 2018

(86) PCT No.: PCT/CN2018/073932
§ 371 (c)(1),
(2) Date: Jan. 11, 2019

(87) PCT Pub. No.: WO2019/134197
PCT Pub. Date: Jul. 11, 2019

(65) Prior Publication Data
US 2021/0336869 A1    Oct. 28, 2021

(30) Foreign Application Priority Data

Jan. 8, 2018 (CN) .......................... 201810015643.1

(51) Int. Cl.
*H04L 12/721* (2013.01)
*G06K 9/62* (2006.01)
*H04L 12/707* (2013.01)

(52) U.S. Cl.
CPC .......... *H04L 45/123* (2013.01); *G06K 9/6278* (2013.01); *H04L 45/14* (2013.01); *H04L 45/22* (2013.01)

(58) Field of Classification Search
CPC ....... H04L 45/123; H04L 45/22; H04L 45/14; G06K 9/6278
See application file for complete search history.

(56) References Cited

U.S. PATENT DOCUMENTS

| 2011/0010322 | A1 | 1/2011 | Acharya |
| 2014/0247148 | A1* | 9/2014 | Proud .................. A61B 5/0024 340/870.02 |

FOREIGN PATENT DOCUMENTS

| CN | 101056475 A | 10/2007 |
| CN | 104703195 A | 6/2015 |
| CN | 106780568 A | 5/2017 |

* cited by examiner

*Primary Examiner* — Jianye Wu
(74) *Attorney, Agent, or Firm* — SZDC Law P.C.

(57) ABSTRACT

The invention relates to a method and system for selecting a least-loaded route based on a naive Bayes classifier, so that the performance of a method for selecting a least-loaded route is improved. A network snapshot records historical network status information, and a naive Bayes classifier is used to predict the potential future network blocking probability if a service connection is established along a candidate route between each node pair. A network snapshot corresponds to each service request that arrives, and records the number of busy capacity units on each link.

9 Claims, 6 Drawing Sheets

(a)

(b)

(a)

(b)

(a)

(b)

(a)

(b)

METHOD AND SYSTEM FOR SELECTING LEAST-LOADED ROUTE BASED ON NAIVE BAYES CLASSIFIER

This application is the National Stage Application of PCT/CN2018/073932, filed on Jan. 24, 2018, which claims priority to Chinese Patent Application No.: 201810015643.1, filed Jan. 8, 2018, which is incorporated by reference for all purposes as if fully set forth herein.

FIELD OF THE INVENTION

The present invention specifically relates to a method and system for selecting a least-loaded route based on a naive Bayes classifier.

BACKGROUND OF THE INVENTION

Routing algorithms in circuit-switched networks have been studied for many years. In general, these algorithms can be categorized as fixed shortest path routing, fixed-alternate path routing, and adaptive routing.

Fixed shortest path routing always chooses a fixed shortest route between a pair of nodes to establish the service connection.

Fixed-alternate path routing works with a set of routes for service establishment, which are tried in sequence for route establishment until all the routes have been tried.

Adaptive routing chooses the most efficient route for each service demand based on the current network status.

Machine learning (ML) techniques have become popular in many applications because they can provide frameworks for solving difficult problems. They have also been used to solve optimization problems in telecommunication networks. For example, for optical networks, a set of intelligent pre-adjustment strategies is enabled by machine learning to tackle spectrum defragmentation. Bayesian inference is applied to a virtual network reconfiguration framework and the Bayesian Attractor Model is introduced to infer the current traffic conditions. It is considered the probability that a candidate light path fails to meet the Quality of Transmission (QoT) requirement and predicted this probability using a random forest. Similarly, in wireless networks, machine learning applications to data routing in wireless sensor networks (WSNs) and mobile ad-hoc networks (MANETs) are presented. An improved wireless adaptive routing protocol using machine learning techniques is proposed. Reinforcement learning for wireless network management is applied to reduce protocol overhead and improve the packet delivery ratio.

ML techniques have also been used in circuit-switched networks. Reinforcement learning techniques for routing in circuit-switched networks are applied. A Q-routing algorithm is also proposed. A gradient algorithm based on Q-routing is proposed. However, these circuit-switched routing algorithms are fixed route oriented, which significantly limits their overall routing performance due to their inflexibility in route selection when provisioning online service connections.

In circuit-switched networks, for the past several decades, the least loaded routing algorithm has been used as a benchmark because it generally does best in terms of lower connection blocking probabilities. Even though ML techniques have been tried in various areas, including communication networks, to the best of our knowledge, currently no ML technique has been applied to enhance the routing performance of a circuit-switched network.

SUMMARY OF THE INVENTION

To solve the foregoing technical problem, the objective of the present invention is to provide a method and system for selecting a least-loaded route based on a naive Bayes classifier that achieves the best balance between traffic load on a route and the service blocking probability by using a machine learning method.

To achieve the foregoing objective, a method for selecting a least-loaded route based on a naive Bayes classifier of the present invention includes:

finding candidate routes between a node pair sd when a service connection is established and placing the candidate routes in a set $R^{sd}$;

when a service connection is established on each candidate route between a pair of nodes, calculating the sum load of each candidate route according to the current network capacity utilization status, and operating a naive Bayes classifier to predict the future potential connection blocking probability of an entire network if and after a service connection is established along the candidate route; and choosing a route with the least load as well as having the lowest impact on the success of future service connection establishment if a service connection is established along the route based on the following equation:

$$R^*_{sd} = \arg\min_{k}(BP_{net}^{sd,k} \cdot u_k^{sd})$$

wherein $R_{sd}^*$ is a route with the least load as well as having the lowest impact on the success of future service connection establishment if a service connection is established along this route between the node pair sd, $BP_{net}^{sd,k}$ is a future potential network-wide blocking probability when a service connection is established on a candidate route $r_k^{sd}$ between a pair of nodes sd, and $u_k^{sd}$ is a sum load of the candidate route $r_k^{sd}$.

Furthermore, said "operating a naive Bayes classifier to predict the future potential connection blocking probability of an entire network if and after a service connection is established along the candidate route" includes:

whenever a new service request between a pair of nodes arrives, recording the current network link capacity status as a network snapshot, with time, a sequence of network snapshots is formed. The network snapshot is denoted by a vector as follows:

$$S^{(i)} = [U_1^{(i)}, \ldots, U_j^{(i)}, \ldots, U_L^{(i)}]^T$$

wherein, superscript i denotes an $i^{th}$ network snapshot, which the one when the $i^{th}$ service connection request arrives, L is the total number of network links, and $U_j^{(i)}$ is the total number of capacity units used on link j, $U_j^{(i)}$ can be considered as a feature $x_j$ in vector X;

for each candidate route $r_k^{sd} \in R^{sd}$, if a service connection is established along this route, a network snapshot $S_c$ would be updated to:

$$S_k = S_c + r_k^{sd}$$

after a service connection is established along $r_k^{sd}$, which leads to a new network snapshot $S_k$, estimating the future potential service blocking probability between each node pair s'd', which can be any node pair in the network, as:

$$BP_{s'd'}^{sd,k} = P(Y=1|<S_k, s'd'>)$$

after a service connection is established along $r_k^{sd}$, calculating a network-wide blocking probability of future service connections as:

$$BP_{net}^{sd,k} = \Sigma_{s'd'} l_{s'd'} \cdot BP_{s'd'}^{sd,k}$$

wherein, $l_{s'd'}$ is the ratio of traffic load between node pair s'd' to the total traffic in the entire network, the relationship $\Sigma_{s'd'} l_{s'd'} = 1$ holds and $l_{s'd'}$ is calculated as:

$$l_{s'd'} = \frac{\sum_{i=1}^{H} I\{s'd'^{(i)} = s'd'\}}{H}$$

wherein $I\{s'd'^{(i)} = s'd'\}$ is an indicator function to tell if the $i^{th}$ service request is initiated by node pair s'd', and if it is, the value of the indicator function is 1, or otherwise, the value of the indicator function is 0; and said "calculating the sum load of each candidate route" includes:

for each candidate route $r_k^{sd} \in R^{sd}$, calculating their sum load on their traversed links, wherein the sum load is calculated as:

$$u_k^{sd} = \Sigma_{i \in r_k^{sd}} u_{k,i}^{sd}$$

wherein, $u_k^{sd}$ is the sum load on the candidate route $r_k^{sd}$ and $u_{k,i}^{sd}$ is capacity utilization on the $i^{th}$ link of route $r_k^{sd}$, defined as:

$$u_{k,i}^{sd} = \frac{U_i^c}{W_i}$$

wherein $W_i$ is the number of total capacity units on link i, $U_i^c$ is the number of capacity units used on link i in the network snapshot $S_c$.

Specifically, a specific calculation method of predicting a potential blocking probability by using the naive Bayes classifier includes: defining a network snapshot and an index of the node pair requesting a service connection as problem instances of the naive Bayes classifier, where a mathematical expression is:

$$X = [S, sd]^T$$

wherein, S denotes a network snapshot, sd is an index of the node pair requesting a service connection and is a feature of the problem instance. This new request may be either established or declined depending on the current network capacity utilization. Let a binary variable Y denote the outcome of the classifier when it is given the input X.

Specifically, Y=0 if the call request between sd is served; otherwise, Y=1 if the call request between sd is blocked, and defining a conditional probability $P(Y=1|X)=P(Y=1|<S, sd>)$ as a potential blocking probability of a service request between node pair sd based on the current network snapshot S. Using Bayes' theorem, this conditional probability can be written as:

$$P(Y=1|X) = \frac{P(Y=1) \cdot P(X|Y=1)}{P(X)}$$

for a circuit-switched network where connection requests arrive dynamically, P(Y=1) denotes the overall network-wide blocking probability of the service requests that have arrived:

$$P(Y=1) = \frac{\sum_{i=1}^{H} I\{Y^{(i)} = 1\}}{H}$$

wherein H is the total number of service requests that have arrived, $I\{Y^{(i)}=1\}$ is an indicator function, which is 1 if the $i^{th}$ arrived request is blocked, and which otherwise is 0;

P (X|Y=1) is the probability of finding the network in state S with a request initiated between node pair sd given that the service request is blocked. Using suitable independence assumptions, this may be expanded as follows:

$$P(X|Y=1) = P(S|Y=1) \cdot P(sd|Y=1) = \Pi_{j=1}^{L} P(U_j = U_j^s|Y=1) \cdot P(sd|Y=1)$$

The capacity usage on the links are independent of each other, and they are also independent of the node pair that initiates the request. $U_j^s$ is the number of capacity units used on link j in the network snapshot S, and $P(U_j = U_j^s|Y=1)$ is the probability that the number of capacity units used on link j is equal to $U_j^s$ when a service request is blocked.

We can now calculate $P(U_j=U_j^s|Y=1)$ and $P(sd|Y=1)$ using the following two equations:

$$P(U_j = U_j^s | Y = 1) = \frac{\sum_{i=1}^{H} I\{U_j^{(i)} = U_j^s \wedge Y^{(i)} = 1\}}{\sum_{i=1}^{H} I\{Y^{(i)} = 1\}}$$

$$P(sd|Y=1) = \frac{\sum_{i=1}^{H} I\{sd^{(i)} = sd \wedge Y^{(i)} = 1\}}{\sum_{i=1}^{H} I\{Y^{(i)} = 1\}}$$

wherein, $I\{U_j^{(i)}=U_j^s \wedge Y^{(i)}=1\}$ is an indicator function which is equal to 1 if the $i^{th}$ service request is blocked and the number of capacity units used on link j is equal to $U_j^s$, and $I\{sd^{(i)}=sd \wedge Y^{(i)}=1\}$ is an indicator function, which is equal to 1 if the $i^{th}$ service request is initiated by node pair sd and it is blocked. The both denominators are the total number of connections out of H which were blocked.

We also need to find P(X), which is derived as follows:

$$P(X) = P(S, sd) = P(S) \cdot P(sd) = \prod_{j=1}^{L} P(U_j = U_j^s) \cdot P(sd)$$

Here $P(U_i=U_j^s)$ and P(sd) are calculated as follows:

$$P(U_j = U_j^s) = \frac{\sum_{i=1}^{H} I\{U_j^{(i)} = U_j^s\}}{H}$$

$$P(sd) = \frac{\sum_{i=1}^{H} I\{sd^{(i)} = sd\}}{H}$$

Here $I\{U_j^{(i)}=U_j^s\}$ is an indicator function which is equal to 1 if the number of capacity units used on link j is equal to $U_j^s$ when the $i^{th}$ service request arrives, and $I\{sd^{(i)}=sd\}$ is an indicator function which is equal to 1 if the $i^{th}$ request is initiated by node pair sd.

Preferably, a parallel computing system is used to speed up the learning process, which is made up of a cluster controller and cluster computers (or computing clients), the cluster controller is responsible for distributing the computation tasks to the computing clients and gathering the results fed back by the latter. The computing clients work in parallel and feedback the results of their computation to the cluster controller. Once the cluster controller receives feedback, it will update the total number of blocked events in the entire simulation system and the related parameters by integrating all the feedback information from all the cluster computers.

To achieve the foregoing objective, a system for selecting a least-loaded route based on a naive Bayes classifier of the present invention includes:

a unit for establishing a candidate route set, configured to: determine all candidate routes for establishing a service connection between a node pair sd, and place the candidate routes in a set $R^{sd}$;

a unit for calculating a future potential connection blocking probability when a service connection is established on a candidate route and sum load of each candidate route, configured to: when a service connection is established on each candidate route between a pair of nodes, calculating the sum load of each candidate route according to the current network capacity utilization status, and operating a naive Bayes classifier to predict the future potential connection blocking probability of an entire network when a service connection is established on this candidate route; and a unit for determining a most optimal route, configured to choose a route with the least load as well as having the lowest impact on the success of future service connection establishment when a service connection is established along this route based on the following equation:

$$R_{sd}^* = \arg\min_k \left(BP_{net}^{sd,k} \cdot u_k^{sd}\right)$$

wherein $R_{sd}^*$ is a route with the least load as well as having the lowest impact on the success of future service connection establishment when a service connection is established along it between the node pair sd, $BP_{net}^{sd,k}$ is a future potential network-wide blocking probability when a service connection is established on a candidate route $r_k^{sd}$ between a pair of nodes sd, and $u_k^{sd}$ is a sum load of the candidate route $r_k^{sd}$.

The system further includes a unit for collecting a sequence of network snapshots, configured to record the current network link capacity status, specifically including: whenever a new service request between a pair of nodes arrives, recording the current network link capacity status as a network snapshot, with time, a sequence of network snapshots is formed. The network snapshot is denoted by a vector as follows:

$$S^{(i)}=[U_1^{(i)}, \ldots, U_j^{(i)}, \ldots, U_L^{(i)}]^T$$

wherein, superscript i denotes an $i^{th}$ network snapshot, which is the one when the $i^{th}$ service connection request arrives, L is the total number of network links, and $U_j^{(i)}$ is the total number of capacity units used on link j, $U_j^{(i)}$ can be considered as a feature $x_j$ in vector X;

the unit for calculating a future potential connection blocking probability and sum load of each candidate route includes a module for calculating a future potential connection blocking probability and a module for calculating sum load of each candidate route, wherein the module for calculating a future potential connection blocking probability is configured to calculate the future potential connection blocking probability of the entire network when each candidate route is used to establish a service connection between a node pair, and a specific calculation process includes:

for each candidate route $r_k^{sd} \in R^{sd}$, if a service connection is established along the route, a network snapshot $S_c$ would be updated to:

$$S_k = S_c + r_k^{sd}$$

after a service connection is established along $r_k^{sd}$, which leads to a new network snapshot $S_k$, estimating the potential service blocking probability between each node pair s'd', which can be any node pair in the network, as:

$$BP_{s'd'}^{sd,k}=P(Y=1|<S_k, s'd'>)$$

after a service connection is established along $r_k^{sd}$, calculating a network-wide blocking probability of future service connections as:

$$BP_{net}^{sd,k}=\Sigma_{s'd'}l_{s'd'} \cdot BP_{s'd'}^{sd,k}$$

wherein, $l_{s'd'}$ is the ratio of traffic load between node pair s'd' to the total traffic in the entire network, the relationship $\Sigma_{s'd'}l_{s'd'}=1$ holds and $l_{s'd'}$ is calculated as:

$$l_{s'd'} = \frac{\sum_{i=1}^{H} I\{s'd'^{(i)} = s'd'\}}{H}$$

wherein $I\{s'd'^{(i)}=s'd'\}$ is an indicator function to tell if the $i^{th}$ service request is initiated by the node pair s'd', and if it is, value of the indicator function is 1, or otherwise, the value of the indicator function is 0; and the module for calculating sum load of each candidate route is configured to calculate the sum load of a candidate route when the candidate route $r_k^{sd}$ is used to establish a service connection between the node pair sd, wherein the sum load is calculated as:

$$u_k^{sd}=\Sigma_{i \in r_k^{sd}} u_{k,i}^{sd}$$

wherein, $u_k^{sd}$ is the sum load of a candidate route and $u_{k,i}^{sd}$ is capacity utilization on the $i^{th}$ link of the route $r_k^{sd}$ defined as:

$$u_{k,i}^{sd} = \frac{U_i^c}{W_i}$$

wherein $W_i$ is the number of total capacity units on link i, $U_i^c$ is the number of capacity units used on link i in the network snapshot $S_c$.

Specifically, the module for calculating a future potential connection blocking probability operates the naive Bayes classifier to predict a future potential connection blocking probability, wherein a method for operating the naive Bayes classifier includes:

defining a network snapshot and an index of the node pair requesting a service connection as problem instances of the naive Bayes classifier, where a mathematical expression is:

$$X=[S, sd]^T$$

wherein, S denotes a network snapshot, sd is an index of the node pair requesting a service connection and is a feature of the problem instance. This new request may be either established or declined depending on the current network capacity utilization. Let a binary variable Y denote the outcome of the classifier when it is given the input X.

Specifically, Y=0 if the call request between sd is served; otherwise, Y=1 if the call request between sd is blocked, and defining a conditional probability $P(Y=1|X)=P(Y=1|<S, sd>)$ as a potential blocking probability of a service request between node pair sd based on the current network snapshot S. Using Bayes' theorem, this conditional probability can be written as:

$$P(Y=1|X) = \frac{P(Y=1) \cdot P(X|Y=1)}{P(X)}$$

for a circuit-switched network where connection requests arrive dynamically, P(Y=1) denotes the overall network-wide blocking probability of the service requests that have arrived:

$$P(Y=1) = \frac{\sum_{i=1}^{H} I\{Y^{(i)}=1\}}{H}$$

wherein H is the total number of service requests that have arrived, $I\{Y^{(i)}=1\}$ is an indicator function, which is 1 if the $i^{th}$ arrived request is blocked, and which otherwise is 0; P(X|Y=1) is the probability of finding the network in state S with a request initiated between node pair sd given that the service request is blocked. Using suitable independence assumptions, this may be expanded as follows:

$$P(X|Y=1)=P(S|Y=1) \cdot P(sd|Y=1) \Pi_{j=1}^{L} P(U_j=U_j^s|Y=1) \cdot P(sd|Y=1)$$

The capacity usage on the links are independent of each other, and that they are also independent of the node pair that initiates the request. $U_j^s$ is the number of capacity units used on link j in the network snapshot S, and $P(U_j=U_j^s|Y=1)$ is the probability that the number of capacity units used on link j is equal to $U_j^s$ when a service request is blocked.

We can now calculate $P(U_j=U_j^s|Y=1)$ and P(sd|Y=1) using the following two equations:

$$P(U_j=U_j^s|Y=1) = \frac{\sum_{i=1}^{H} I\{U_j^{(i)}=U_j^s \wedge Y^{(i)}=1\}}{\sum_{i=1}^{H} I\{Y^{(i)}=1\}}$$

$$P(sd|Y=1) = \frac{\sum_{i=1}^{H} I\{sd^{(i)}=sd \wedge Y^{(i)}=1\}}{\sum_{i=1}^{H} I\{Y^{(i)}=1\}}$$

wherein, $I\{U_j^{(i)}=U_j^s \wedge Y^{(i)}=1\}$ is an indicator function, which is equal to 1 if the $i^{th}$ service request is blocked and the number of capacity units used on link j is equal to $U_j^s$, and which otherwise is 0, and $I\{sd^{(i)}=sd \wedge Y^{(i)}=1\}$ is an indicator function, which is equal to 1 if the $i^{th}$ service request is initiated by node pair sd and it is blocked, and which otherwise is 0. The both denominators are the total number of connections out of H which were blocked.

We also need to find P(X), which is derived as follows:

$$P(X)=P(S, sd)=P(S) \cdot P(sd)=\Pi_{j=1}^{L} P(U_j=U_j^s) \cdot P(sd)$$

Here $P(U_j=U_j^s)$ and P(sd) are calculated as follows:

$$P(U_j=U_j^s) = \frac{\sum_{i=1}^{H} I\{U_j^{(i)}=U_j^s\}}{H}$$

$$P(sd) = \frac{\sum_{i=1}^{H} I\{sd^{(i)}=sd\}}{H}$$

Here $I\{U_j^{(i)}=U_j^s\}$ is an indicator function, which is equal to 1 if the number of capacity units used on link j is equal to $U_j^s$ when the $i^{th}$ service request arrives, and which otherwise is 0; and $I\{sd^{(i)}=sd\}$ is an indicator function, which is equal to 1 if the $i^{th}$ request is initiated by node pair sd, and which otherwise is 0.

Preferably, a parallel computing system is used to calculate the future potential network-wide blocking probability, which is made up of a cluster controller and cluster computers (or computing clients), the cluster controller is responsible for distributing the computation tasks to the computing clients and gathering the results fed back by the latter. The computing clients work in parallel and feedback the results of their computation to the cluster controller. Once the cluster controller receives feedback, it will update the total number of blocked events in the entire learning system and the related parameters by integrating all the feedback information from all the cluster computers.

In particular, the parallel system can learn 10 million arrival events, we need to run 10 rounds of sub-learning processes. Each time when one round of sub-learning processes is completed, the cluster controller will initiate another round of sub-learning processes. When doing this, the cluster controller will forward the parameters learned based on the previous round to each of the cluster computers. The latter will use these updated parameters to run the learning processes for another round of arrival events and meanwhile collect the information for updating the related parameters. The entire learning process will terminate when the total number of planned learned events are reached. Then the cluster controller will find the final service connection blocking probability and the final updated parameters.

By means of the foregoing solution, the method and system for selecting a least-loaded route based on a naive Bayes classifier of the present invention at least has the following advantages:

A naive Bayes classifier is used to predict potential future network blocking probability if a service connection is established along each candidate route between each node pair. A network snapshot corresponds to each service request that arrives, and records the number of capacity units used on each link. Based on these network snapshots, if a current service request establishes a connection on a candidate route, the naive Bayes classifier predicts the potential blocking probability of establishing a future service connection, and finally selects, from all candidate routes between a node pair, a route that has the least load and the lowest impact on potential blocking of establishing a future service connection (if a service connection is established along the route) to establish a service connection.

The performance of the method is assessed through simulation, and compared with a conventional least-loaded routing algorithm. Results show that naive Bayes classifier-assisted least loaded routing algorithm is effective in further reducing the blocking probability of service connection requests, and outperforms the conventional least-loaded routing algorithm.

The foregoing describes the technical solutions of the present invention briefly. To make the technical solutions of the present invention more comprehensible and perform implementation based on the content in the specification, detailed description is provided below in conjunction with preferred embodiments and accompanying drawings of the present invention.

DETAILED DESCRIPTION OF THE EMBODIMENTS

Figure 1:
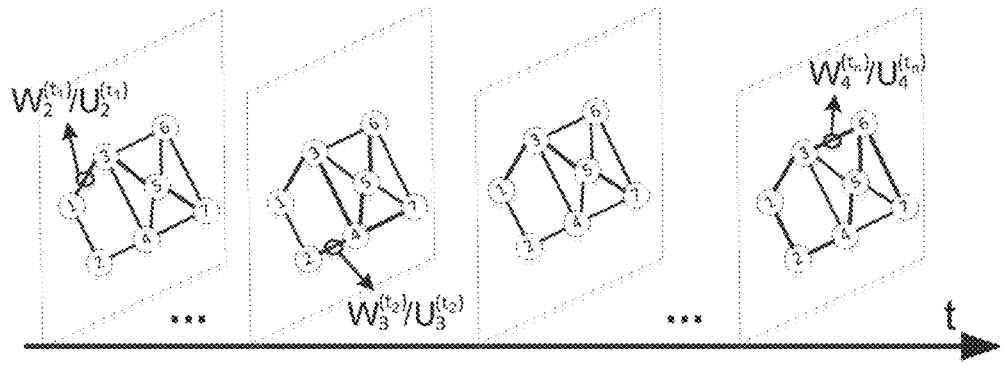
FIG. 1 is a diagram of a sequence of network snapshots with time.
Figure 2:
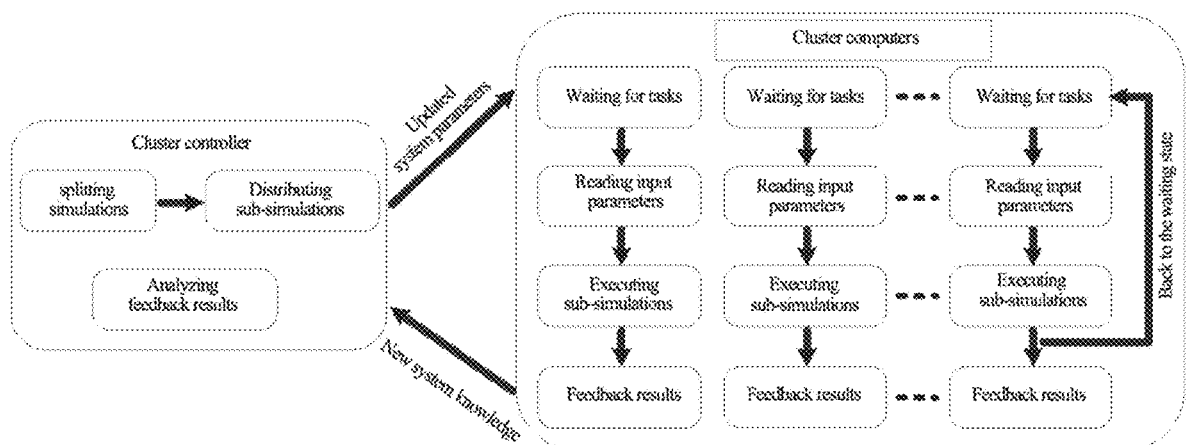
FIG. 2 is a block diagram of a parallel computing system.

Specific implementations of the present invention are further described below in detail with reference to the accompanying drawings and the embodiments. The following embodiments are used to describe the present invention without limitation.

The blocking probability performance of a conventional least-loaded routing algorithm may be improved, because when a least-loaded route is selected to provide a service connection, in some cases, the least-loaded route may excessively consume network resources. Over-consumption of resources means that compared with resources required for the shortest route, additional resources are required for a least-loaded route. In the past, it is very difficult to resolve such a low-efficiency problem. In the present invention, machine learning techniques are used to develop a naive Bayes classifier-assisted least-loaded routing algorithm to solve the foregoing low-efficiency problem of resource utilization and further make a breakthrough based on a blocking performance over the conventional least-loaded routing algorithm. A network snapshot is historical data of machine learning and is applied to a supervised naive Bayes classifier to predict a potential future blocking probability of an entire network if a service connection is established on a suitable route. With such information, this route has relatively low load and has a relatively low negative impact on the successful establishment of a future service connection if a service connection is established along this route.

Introduction to the supervised naive Bayes classifier is as follows:

During machine learning, the naive Bayes classifier is a simple probability classifier and a strong independence assumption based on Bayes' theorem and a Bayesian feature, and can calculate probabilities having different output classes for each input instance.

It is assumed that a vector X represents a problem instance, and $x_1, \ldots, x_n$ represent n features of an instance. It is assumed there are k class labels, $C_1, \ldots, C_k$. Naive Bayes is a conditional probability model, wherein $P(C_k|X)$ denotes the instance probability of $C_k$ given X. According to Bayes' theorem, it may be obtained that a conditional probability is:

$$P(C_k|X) = P(C_k|x_1, \ldots, x_n) = \frac{P(C_k) \cdot P(X_1, \ldots, X_n|C_k)}{P(x_1, \ldots, x_n)}, \quad (1)$$

wherein a "naive" conditional independence assumption considers that each feature is conditionally independent from other features, and therefore the instance probability can be denoted as:

$$P(C_k|X) = \frac{P(C_k) \cdot \prod_{j=1}^{n} P(X_j|C_k)}{\prod_{j=1}^{n} P(x_j)}. \quad (2)$$

To further improve the performance of a least-loaded routing algorithm, a naive Bayes classifier is used in the present invention, i.e. if a service connection is established on a candidate route between a pair of nodes, a future potential connection blocking probability of the entire network is predicted based on the current network link capacity status. Next, a route that has the least load and minimal impact on the establishment of a future service connection (when a service connection is established along the route) is selected according to the prediction information and load on each candidate route to establish a service connection. This can help the least-loaded routing algorithm to further reduce blocking probability of all service connections in an entire circuit-switched network.

Introduction of a network snapshot:

In a supervised naive Bayes classifier, a network snapshot is defined as a part of a problem instance. The network snapshot records information about the capacity status of each network link. Each time when there is a service request between the node pair arriving, the current network link capacity status is recorded as a network snapshot. As time elapses, a sequence of network snapshots shown in FIG. 1 may be formed. In each snapshot, both the total link capacity and capacity units used on the link are recorded. For example, in FIG. 1, a service request arrives at $t_i$, and the current link status is recorded as $W_j^{(t_i)}$ and $U_j^{(t_i)}$, wherein $W_j^{(t_i)}$ denotes the total capacity on link j, and $U_j^{(t_i)}$ denotes capacity units used on link j.

The total link capacity $W_j^{(t_i)}$ may change with time. However, in most cases, once a network is deployed, the total link capacity $W_j^{(t_i)}$ is considered fixed within a particular time. In the present invention, a vector is used to denote a network snapshot:

$$S^{(i)} = [U_1^{(i)}, \ldots, U_j^{(i)}, \ldots, U_L^{(i)}]^T \qquad (3)$$

wherein, the superscript i denotes an $i^{th}$ network snapshot, the $i^{th}$ network snapshot corresponds to an $i^{th}$ arriving service connection request, L is the total number of network links, $U_j^{(i)}$ is the total number of capacity units used on link j and may be considered as a feature $x_j$ in the vector X.

Prediction of the future potential blocking probability of a network if a service connection is established along a candidate route:

A network snapshot that includes the information on the network link capacity usage is known. For a service request between a node pair, a supervised naive Bayes classifier may be used to predict the potential future service blocking probability of the whole network if and after a service connection is established on a route between the node pair.

A problem instance or a vector that needs to be classified is defined first:

$$X = [S, sd]^T \qquad (4).$$

Here, S denotes the foregoing network snapshot. sd is an index of a node pair that requests a service connection and is also a feature of a vector. This service request may be established or blocked according to current network capacity utilization. A binary variable Y is used to denote a classification result for an input X of a classifier. Specifically, if the service request between sd is successfully established, Y=0 is set, or otherwise, Y=1 is set to denote that the service request between sd is blocked.

In the present invention, a parallel computing system built in a laboratory is used to implement parallel learning and performance assessment. Simulation researches show that the naive Bayes classifier-assisted least-loaded routing algorithm can practically improve blocking performance of a conventional least-loaded routing algorithm. Compared with the conventional least-loaded routing algorithm, the naive Bayes classifier-assisted least-loaded routing algorithm shows fewer extra hops when establishing a service connection compared to the simple shortest route between each node pair. Therefore, in the naive Bayes classifier-assisted least-loaded routing algorithm, when a service connection is established on a route having a relatively light load, the extra hop count of a service connection can be effectively controlled. In addition, blocking performance of the naive Bayes classifier-assisted least-loaded routing algorithm is closely related to the number of learned network snapshots. As the number of network snapshots learned increases, the blocking probability decreases and becomes more accurate. The parallel computing system especially used for learning a large number of network snapshots is efficient in the calculation. 90% of the time can be saved in a learning process compared to a non-parallel computing system.

Embodiment 1

A method for selecting a least-loaded route based on a naive Bayes classifier in this embodiment includes: when each candidate route is used to establish a service connection between a node pair sd, determining candidate routes during establishment of a service connection between the node pair sd, and placing the candidate routes in a set $R^{sd}$; calculating load of each candidate route according to information about the capacity status of each network link, and operating a naive Bayes classifier to predict the future potential connection blocking probability of an entire network if the above service connection is established along this candidate route; and determining a most optimal route between the node pair sd according to a route selection formula, wherein the route selection formula is:

$$R_{sd}^* = \underset{k}{\operatorname{argmin}} \left( BP_{net}^{sd,k} \cdot u_k^{sd} \right)$$

In the formula, $R_{sd}^*$ is the most optimal route among all candidate routes between the node pair sd, $BP_{net}^{sd,k}$ is the future potential blocking probability of the entire network when the candidate route $r_k^{sd}$ is used to establish a service connection between the node pair sd, and $u_k^{sd}$ is the sum load of the candidate route $r_k^{sd}$. In this embodiment, after a service is established on a candidate route between a pair of nodes, the naive Bayes classifier predicts the future potential connection blocking probability of the entire network based on the current network link capacity status; and selects, according to the aforementioned potential connection blocking probability of the whole network and load on a candidate route, a route that can achieve balance between impact on establishment of a future service connection (if a service connection is established along it) and routing load to establish a service connection. In this embodiment, the method specifically includes:

defining a conditional probability $P(Y=1|X)=P(Y=1|S, sd)$ to denote a potential blocking probability of a service request between the node pair sd based on a current network snapshot S, where following Bayes' theorem, this conditional probability may be denoted as:

$$P(Y = 1 \mid X) = \frac{P(Y = 1) \cdot P(X \mid Y = 1)}{P(X)}, \qquad (5)$$

where for a circuit-switched network having connection requests that dynamically arrive, P(Y=1) denotes the overall network-wide blocking probability of service requests that have arrived:

$$P(Y = 1) = \frac{\sum_{i=1}^{H} I\{Y^{(i)} = 1\}}{H}, \qquad (6)$$

wherein H is the total number of service requests that have arrived, $I\{Y^{(i)}=1\}$ is an indicator function, where if an $i^{th}$ request that arrives is blocked, a value of the indicator function is equal to 1, or otherwise, a value of the indicator function is equal to 0. Therefore, (6) is used to calculate the ratio of blocked service requests to the total number of requests that have arrived.

P(X|Y=1) denotes a probability of a current network status in the network snapshot S when a service request initiated between a node pair is blocked; and if a node pair between which a service request is initiated is sd, this expression may be further derived:

$$P(X|Y=1) = P(S|Y=1) \cdot P(sd|Y=1) = \Pi_{j=1}^{L} P(U_j = U_j^s | Y=1) \cdot P(sd|Y=1) \qquad (7).$$

Here, it is assumed that the capacity usage on each link is independent, and is also independent of a node pair that initiates a request. $U_j^s$ is the number of capacity units used on link j in the network snapshot S, and $P(U_j = U_j^s | Y=1)$ is a probability that the number of capacity units used on link j is equal to $U_j^s$ when a service request is blocked.

$P(U_j=U_j^s|Y=1)$ and $P(sd|Y=1)$ may be calculated by using the following two formulas:

$$P(U_j = U_j^S \mid Y = 1) = \frac{\sum_{i=1}^{H} I\{U_j^{(i)} = U_j^S \wedge Y^{(i)} = 1\}}{\sum_{i=1}^{H} I\{Y^{(i)} = 1\}}, \text{ and} \quad (8)$$

$$P(sd \mid Y = 1) = \frac{\sum_{i=1}^{H} I\{sd^{(i)} = sd \wedge Y^{(i)} = 1\}}{\sum_{i=1}^{H} I\{Y^{(i)} = 1\}}. \quad (9)$$

In (8), $I\{U_j^{(i)}=U_j^s \wedge Y^{(i)}=1\}$ is an indicator function, where if the $i^{th}$ service request is blocked, and the number of capacity units used on link j is equal to $U_j^s$, a value of the indicator function is 1, or otherwise, a value of the indicator function is equal to 0. In (9), $I\{sd^{(i)}=sd \wedge Y^{(i)}=1\}$ is an indicator function, where if the $i^{th}$ service request is blocked, and the service request is initiated by the node pair sd, a value of the indicator function is 1, or otherwise a value of the indicator function is 0.

P(X) further needs to be found for Formula (3), and the derivation of P(X) is as follows:

$$P(X)=P(S, sd)=P(S) \cdot P(sd)=\Pi_{j=1}^{L} P(U_j=U_j^s) \cdot P(sd) \quad (10),$$

where calculation formulas of $P(U_j=U_j^s)$ and $P(sd)$ are as follows:

$$P(U_j = U_j^S) = \frac{\sum_{i=1}^{H} I\{U_j^{(i)} = U_j^S\}}{H}, \text{ and} \quad (11)$$

$$P(sd) = \frac{\sum_{i=1}^{H} I\{sd^{(i)} = sd\}}{H}, \quad (12)$$

wherein $I\{U_j^{(i)}=U_j^s\}$ is an indicator function, where if the number of capacity units used on link j is equal to $U_j^s$ when the $i^{th}$ service request arrives, a value of the indicator function is 1, or otherwise, a value of the indicator function is equal to 0; and $I\{sd^{(i)}=sd\}$ is an indicator function, where if a node pair that initiates the request is sd when the $i^{th}$ service request arrives, a value of the indicator function is 1, or otherwise, a value of the indicator function is equal to 0.

It is assumed that there is a new service request between the node pair sd, and the network snapshot S records the current network link capacity status. It is assumed that a plurality of candidate routes are used to establish a service connection between the node pair sd. A problem that needs to be solved now is which route should be selected to establish a service connection. In the conventional least-loaded routing algorithm, a least-loaded route is selected. However, in some cases, network resources are excessively consumed. Over-consumption of resources means that compared with resources required for the shortest route, additional resources are required for a least-loaded route. In a naive Bayes classifier-assisted least-loaded routing algorithm, in addition to load on a route, the impact of an established service connection on successful establishment of a future service connection in the entire network is further considered. The naive Bayes classifier-assisted least-loaded routing algorithm is used to achieve such optimal balance.

For each service request between the node pair sd, all candidate routes that are qualified to establish a service connection are found, a candidate route that does not have sufficient capacity is removed from the candidate routes, and the remaining candidate routes are placed in the set $R^{sd}$. Next, if a service connection is established on one of the routes, the establishment of the future service connection will be affected. For each route $r_k^{sd} \in R^{sd}$, it is first assumed that the route $r_k^{sd} \in R^{sd}$ is used to establish a service connection, a network snapshot $S_c$ is updated to:

$$S_k=S_c+r_k^{sd} \quad (13).$$

The potential blocking probability of establishing a future service connection between a node pair s'd' is then calculated based on $S_k$ after a service connection is established on $r_k^{sd}$:

$$BP_{s'd'}^{sd,k}=P(Y=1|S_k,s'd') \quad (14).$$

This potential blocking probability may be calculated by using Formulas from (5) to (12).

After the service connection is established on the route $r_k^{sd}$, the potential blocking probability of the entire network may be calculated, and the formula is as follows:

$$BP_{net}^{sd,k}=\Sigma_{s'd'} l_{s'd'} \cdot BP_{s'd'}^{sd,k} \quad (15).$$

Here, $l_{s'd'}$ is the ratio of traffic load between the node pair s'd' to the total traffic in the entire network, $\Sigma_{s'd'} l_{s'd'}=1$, and calculation of $l_{s'd'}$ is as follows:

$$l_{s'd'} = \frac{\sum_{i=1}^{H} I\{s'd'^{(i)} = s'd'\}}{H}, \quad (16)$$

wherein $I\{s'd'^{(i)}=s'd'\}$ is an indicator function, where if the $i^{th}$ service request is initiated by the node pair s'd', a value of the indicator function is 1, or otherwise a value of the indicator function is 0. Apparently, a service connection is preferentially established on a route having the smallest $BP_{net}^{sd,k}$. Therefore, the service connection established on this route enables the potential blocking probability of the future service connection to be the lowest.

In addition to $BP_{net}^{sd,k}$, for each route $r_k^{sd} \in R^{sd}$, the sum load of all links on the route is also calculated. Specifically, the sum load is defined as:

$$u_k^{sd}=\Sigma_{i \in r_k^{sd}} u_{k,i}^{sd} \quad (17),$$

wherein $u_{k,i}^{sd}$ is capacity utilization on the $i^{th}$ link of the route $r_k^{sd}$, and is defined as:

$$u_{k,i}^{sd} = \frac{U_i^c}{W_i}. \quad (18)$$

$W_i$ is the number of total capacity units on link i, and $U_i^c$ is the number of capacity units used on link i in the network snapshot $S_c$. $u_k^{sd}$ is the sum load of a route, and a service connection is established on a least-loaded route to avoid network blocking.

The naive Bayes classifier-assisted least-loaded routing considers both load on each route and impact of the establishment of a service connection on a route on successful establishment of a future service connection in the network. Therefore, the most optimal route between the node pair sd is determined according to a route selection formula, wherein the route selection formula is:

$$R_{sd}^* = \underset{k}{\mathrm{argmin}}\left(BP_{net}^{sd,k} \cdot u_k^{sd}\right). \quad (19)$$

In the formula, $R_{sd}^*$ is the most optimal route of all candidate routes between the node pair sd. The route has light load and small negative impact on the successful establishment of the future service connection when a service connection is established on the route. $BP_{net}^{sd,k}$ is the future potential blocking probability of the entire network when the candidate route $r_k^{sd}$ is used to establish a service connection between the node pair sd. $u_k^{sd}$ is the sum load of the candidate route $r_k^{sd}$.

In this embodiment, there is a new service request between the node pair sd, and the network snapshot S records the current network link capacity status. In addition, a plurality of candidate routes is used to establish a service connection between the node pair sd. A problem that needs to be solved is which route should be selected to establish a service connection. In the conventional least-loaded routing algorithm, a least-loaded route is selected. However, in some cases, network resources are excessively consumed. Overconsumption of resources means that compared with resources required for the shortest route, additional resources are required for a least-loaded route. In a naive Bayes classifier-assisted least-loaded routing algorithm, in addition to service load on a route, the impact of an established service connection on successful establishment of a future service connection in the entire network is considered. The naive Bayes classifier-assisted least-loaded routing algorithm is used to achieve optimal balance.

In this embodiment, to further improve the performance of a least-loaded routing algorithm, after a service is established on a candidate route between a pair of nodes, a naive Bayes classifier is used to predict the future potential connection blocking probability of an entire network based on the current network link capacity status. Next, a route that has light load and minimal impact on the establishment of a future service connection is selected according to the future potential connection blocking probability and load on each candidate route to establish a service connection. This method can help the least-loaded routing algorithm to further reduce the blocking probability of all service connections in an entire circuit-switched network.

Embodiment 2

A system for selecting a least-loaded route based on a naive Bayes classifier in this embodiment can be configured to perform the method in the foregoing Embodiment 1. The system includes a unit for establishing a candidate-route set and a unit for calculating the future potential blocking probability and routing load of a network.

The unit for establishing a candidate-route set is configured to: determine all candidate routes for establishing a service connection between a node pair sd, and place the candidate routes in a set $R^{sd}$.

The unit for calculating the future potential blocking probability and routing load of a network is configured to: when each candidate route is used to establish a service connection between a node pair, operate a naive Bayes classifier respectively to predict the future potential connection blocking probability of an entire network (after a service connection is established along the route) and load of each candidate route according to information about the capacity status of each network link.

The system further includes a unit for determining a most optimal route, configured to operate a route selection formula to determine a most optimal route between the node pair sd, wherein the route selection formula is:

$$R_{sd}^* = \underset{k}{\mathrm{argmin}}\left(BP_{net}^{sd,k} \cdot u_k^{sd}\right)$$

wherein, $R_{sd}^*$ is the most optimal route of all candidate routes between the node pair sd, $BP_{net}^{sd,k}$ is the future potential blocking probability of the entire network when the candidate route $r_k^{sd}$ is used to establish a service connection between the node pair sd, and $u_j^{sd}$ is the sum load of the route.

The system further includes a unit for generating a sequence of network snapshots which is configured to record information about the capacity status of each network link, specifically including: when there is a service request between a node pair, recording the current network link capacity status as a network snapshot, where a sequence of network snapshots is gradually formed as time elapses, the network snapshot is denoted by using a vector, and an expression is as follows:

$$S^{(i)} = [U_1^{(i)}, \ldots, U_j^{(i)}, \ldots, U_L^{(i)}]^T,$$

wherein, the superscript i denotes an $i^{th}$ network snapshot, the $i^{th}$ network snapshot corresponds to an $i^{th}$ service connection request, L is a total number of network links, and $U_j^{(i)}$ is the number of capacity units used on link j and is considered as a feature $x_j$ in a vector X.

In this embodiment, the unit for calculating the future potential blocking probability and routing load of a network includes a module for calculating the future potential blocking probability of a network and a load calculation module.

The module for calculating the future potential blocking probability of a network is configured to calculate the future potential connection blocking probability of the entire network when each candidate route is used to establish a connection between the node pair sd, where a specific calculation process includes:

when there is a service request between a node pair, recording the current network link capacity status as a network snapshot, where a sequence of network snapshots is gradually formed as time elapses, the network snapshot is denoted by using a vector, and an expression is as follows:

$$S^{(i)} = [U_1^{(i)}, \ldots, U_j^{(i)}, \ldots, U_L^{(i)}]^T,$$

wherein, the superscript i denotes an $i^{th}$ network snapshot, the $i^{th}$ network snapshot corresponds to an $i^{th}$ service connection request, L is a total number of network links, and $U_j^{(i)}$ is the number of capacity units used on link j and is considered as a feature $x_j$ in a vector X;

when the candidate route $r_k^{sd} \in R^{sd}$ is used to establish a service connection, updating a network snapshot $S_c$ to:

$$S_k = S_c + r_k^{sd};$$

after a service connection is established on the candidate route $r_k^{sd}$ based on a network snapshot $S_c$, predicting that the potential blocking probability of establishing a future service connection between a node pair s'd' is:

$$BP_{s'd'}^{sd,k} = P(Y=1 | S_k, s'd');$$

after the service connection is established on the route $r_k^{sd}$, predicting the future potential connection blocking probability of the entire network, wherein a formula is:

$$BP_{net}^{sd,k} = \Sigma_{s'd'} l_{s'd'} \cdot BP_{s'd'}^{sd,k},$$

wherein, $l_{s'd'}$ is the ratio of traffic load between the node pair s'd' to the total traffic load in the entire network, $\Sigma_{s'd'} l_{s'd'} = 1$, and calculation of $l_{s'd'}$ is as follows:

$$l_{s'd'} = \frac{\sum_{i=1}^{H} I\{s'd'^{(i)} = s'd'\}}{H},$$

wherein $I\{s'd'^{(i)} = s'd'\}$ is an indicator function, where if the $i^{th}$ service request is initiated by the node pair s'd', a value of the indicator function is 1, or otherwise a value of the indicator function is 0; and the load calculation module is configured to calculate load of a candidate route when the candidate route $r_k^{sd}$ is used to establish a service connection between the node pair sd, wherein the sum load is defined as:

$$u_k^{sd} = \Sigma_{i \in r_k^{sd}} u_{k,i}^{sd},$$

wherein $u_{k,i}^{sd}$ is capacity utilization on the $i^{th}$ link of the route $r_k^{sd}$, and is defined as:

$$u_{k,i}^{sd} = \frac{U_i^c}{W_i},$$

wherein $W_i$ is the number of total capacity units on link i, $U_i^c$ is the number of capacity units used on link i in the network snapshot $S_c$, and $u_k^{sd}$ is the sum load of a candidate route.

In this embodiment, a blocking probability calculation module operates the naive Bayes classifier to predict the future potential blocking probability of the entire network, where a method for operating the naive Bayes classifier specifically includes: using a network snapshot and a sequence number of node pairs that requests a service connection as problem instances of the naive Bayes classifier, wherein a mathematical expression is:

$$X = [S, sd]^T,$$

wherein, S denotes a network snapshot, sd is an index of a node pair that requests a service connection, and is a feature of a problem instance, where it is determined according to current usage of a network resource to establish or block this service request, and a binary variable Y is used to denote a classification result for an input X of a classifier;

if the service request between sd is successfully established, the present invention Y=0 is set, or otherwise, Y=1 is set to denote that the service request between sd is blocked; and defining a conditional probability $P(Y=1|X)=P(Y=1|S, sd)$ to denote a potential blocking probability of a service request between the node pair sd based on a current network snapshot S, where following Bayes' theorem, this conditional probability is denoted as:

$$P(Y = 1 | X) = \frac{P(Y = 1) \cdot P(X | Y = 1)}{P(X)},$$

where for a circuit-switched network having connection requests that dynamically arrive, P(Y=1) denotes the overall network-wide blocking probability of service requests that have arrived:

$$P(Y = 1) = \frac{\sum_{i=1}^{H} I\{Y^{(i)} = 1\}}{H},$$

wherein H is the total number of service requests that have arrived, $I\{Y^{(i)}=1\}$ is an indicator function, where if an $i^{th}$ request that arrives is blocked, a value of the indicator function is equal to 1, or otherwise, a value of the indicator function is equal to 0;

$P(X|Y=1)$ denotes a probability of a current network status in the network snapshot S when a service request initiated between a node pair is blocked; and if a node pair between which a service request is initiated is sd, this expression is further derived:

$$P(X|Y=1) = P(S|Y=1) \cdot P(sd|Y=1) = \Pi_{j=1}^{L} P(U_j = U_j^s | Y=1)$$

$$P(sd|Y=1),$$

where the capacity usage on each link is independent, and is also independent of a node pair that initiates a request; and $U_j^s$ is the number of capacity units used on link j in the network snapshot S, and $P(U_j=U_j^s|Y=1)$ is a probability that the number of capacity units used on link j is equal to $U_j^s$ when a service request is blocked;

$P(U_j=U_j^s|Y=1)$ and $P(sd|Y=1)$ are calculated by using the following two formulas:

$$P(U_j = U_j^S | Y = 1) = \frac{\sum_{i=1}^{H} I\{U_j^{(i)} = U_j^S \wedge Y^{(i)} = 1\}}{\sum_{i=1}^{H} I\{Y^{(i)} = 1\}}, \text{ and}$$

$$P(sd | Y = 1) = \frac{\sum_{i=1}^{H} I\{sd^{(i)} = sd \wedge Y^{(i)} = 1\}}{\sum_{i=1}^{H} I\{Y^{(i)} = 1\}},$$

wherein, $I\{U_j^{(i)}=U_j^s \wedge Y^{(i)}=1\}$ is an indicator function, where if the $i^{th}$ service request is blocked, and the number of capacity units used on link j is equal to $U_j^s$, a value of the indicator function is equal to 1, or otherwise, a value of the indicator function is equal to 0; and $I\{sd^{(i)}=sd \wedge Y^{(i)}=1\}$ is an indicator function, where if the $i^{th}$ service request is blocked, and the service request is initiated by the node pair sd, a value of the indicator function is 1, or otherwise a value of the indicator function is 0; and derivation of P(X) is as follows:

$$P(X) = P(S, sd) = P(S) \cdot P(sd) = \Pi_{j=1}^{L} P(U_j = U_j^s) \cdot P(sd),$$

where calculation formulas of $P(U_j=U_j^s)$ and P(sd) are as follows:

$$P(U_j = U_j^S) = \frac{\sum_{i=1}^{H} I\{U_j^{(i)} = U_j^S\}}{H}, \text{ and}$$

$$P(sd) = \frac{\sum_{i=1}^{H} I\{sd^{(i)} = sd\}}{H},$$

wherein $I\{U_j^{(i)}=U_j^s\}$ is an indicator function, where if the number of capacity units used on link j is $U_j^s$ when the $i^{th}$ service request arrives, a value of the indicator function is 1, or otherwise, a value of the indicator function is equal to 0; and $I\{sd^{(i)}=sd\}$ is an indicator function, where if a node pair that initiates the request is sd when the $i^{th}$ service request arrives, a value of the indicator function is 1, or otherwise, a value of the indicator function is equal to 0.

In the foregoing embodiments, the specific introduction of how to implement a naive Bayes classifier-assisted least-loaded routing algorithm is as follows:

```
repeat
{
  Z^sd is a new service request between the node pair sd,
  {
    find a candidate route set R^sd of the service request;
    for each route r_k^sd ∈ R^sd
    {
      use (17) and (18) to calculate sum load u_k^sd;
      use (13) to(16) to calculate the potential network-wide blocking
        probability BP_net^sd,k after z^sd is established on r_k^sd;
      specifically, in (14), use (5) to (12) to calculate P(Y = 1|S_k, s'd');
    }
    select a route
```

$$R_{sd}^* = \arg\min_k \left( BP_{net}^{sd,k} \cdot u_k^{sd} \right)$$

```
    if R_sd* = NULL, the service request is blocked, or otherwise, a service
      connection is established on the route.
  }
}
```

In the foregoing learning process, Laplacian smoothing needs to be used in some calculations, and is shown in the following:

$$P(Y = 1) = \frac{\sum_{i=1}^{H} I\{Y^{(i)} = 1\} + 1}{H + 2}, \tag{20}$$

$$P(U_j = U_j^S | Y = 1) = \frac{\sum_{i=1}^{H} I\{U_j^{(i)} = U_j^S \wedge Y^{(i)} = 1\} + 1}{\sum_{i=1}^{H} I\{Y^{(i)} = 1\} + W_j + 1}, \tag{21}$$

$$P(sd | Y = 1) = \frac{\sum_{i=1}^{H} I\{sd^{(i)} = sd \wedge Y^{(i)} = 1\} + 1}{\sum_{i=1}^{H} I\{Y^{(i)} = 1\} + m}, \tag{22}$$

$$P(U_j = U_j^S) = \frac{\sum_{i=1}^{H} I\{U_j^{(i)} = U_j^S\} + 1}{H + W_j + 1}, \tag{23}$$

$$P(sd) = \frac{\sum_{i=1}^{H} I\{sd^{(i)} = sd\} + 1}{H + m}, \text{ and} \tag{24}$$

$$u_{k,i}^{sd} = \frac{U_i^c}{W_i} + \alpha, \tag{25}$$

wherein $W_j$ is the total number of capacity units on link j, m is the total number of node pairs in a network, and $\alpha$ is an extremely small value and is set to $10^{-6}$ in the present invention.

In the present invention, a parallel learning system is designed for a machine learning process. The parallel learning system includes a cluster controller and cluster computers. The cluster controller is the brain of the whole parallel computing system and is responsible for allocating calculation tasks to computing resources and collecting cluster results fed back by the computers. The cluster computers are a group of computers, and execute the tasks in parallel and feed back the results obtained through calculation to the cluster controller. In the present invention, a prototype of this parallel learning system is constructed in a laboratory. The system includes ten small computers, one Ethernet switch, one power supply module, and three fans. Each small computer has one 4.0 GHz quad-core CPU and one 8 GB memory.

Once receiving feedback, the cluster controller gathers all feedback information from all the cluster computers to update the total number of blocking events in an entire simulation system and related parameters in Formulas from (5) to (18). For example, $\Sigma_{i=1}^{H} I\{U_j^{(i)} = U_j^s \wedge Y^{(i)} = 1\}$ counts that when the $i^{th}$ service request is blocked and in the simulation of an $H^{th}$ arrival event, the number of capacity units used on link j is just equal to $U_j^s$. For each cluster computer, after 1,000,000 arrival events are simulated, a number $s_n^k = \Sigma_{i=1}^{H=10^6} I\{U_j^{(i)} = U_j^s \wedge Y^{(i)} = 1\}$ corresponding to the 1,000,000 arrival events may be found, wherein n is the index of the cluster computer in the parallel computing system, and k is the round index of sub-learning process executed by the cluster computer. Therefore, for each round of sub-learning process tasks, if the cluster computers execute tasks in parallel, parameters at the $k^{th}$ round and $s^k = \Sigma_{n \in cluster} s_n^k$ will be obtained, wherein Cluster denotes a group of cluster computers. In a similar manner, the present invention may update other related parameters in the learning process.

To learn as much as possible about an entire routing system, a plurality of rounds of learning processes are required in the present invention. Because the total number of simulating arrival events is 100,000,000, each sub-learning process executed by the parallel computing system may simulate 10,000,000 arrival events, and ten rounds of sub-learning process need to be operated. Each time one round of sub-learning process tasks is completed, the cluster controller starts the second round of sub-learning process tasks. At the same time, the cluster controller forwards parameters in Formulas (5) to (18) obtained in a previous round to each cluster computer. The cluster computer uses these updated parameters to operate another round of learning of arrival events, and collects and updates information about related parameters, where when the total number of planned learned events are reached, an entire process is terminated. Next, the cluster controller finds the final service connection blocking probability and the final updated parameters from (5) to (18).

In the present invention, mathematical formulas of applying a naive Bayes classifier-assisted least-loaded routing algorithm are described. The present invention shows how to generate various arrival events and network snapshots for a learning system based on the current network link capacity status, so that there are sufficient network snapshots for learning. In the present invention, how to apply the machine learning-assisted routing algorithm to an actual network is introduced, so as to process real-time requirements and requests.

The present invention uses a centralized network control system that has a single network controller. This system is similar to a software-defined networking (SDN) control system, both being implemented in a centralized manner. A central controller provides an interface to a user and further monitors and records status information of the entire network for a service application. In addition, the central controller further receives a service request of establishing a service connection of a user according to a current network status. When a service connection is provided, if a service request is accepted, the central controller queries a machine learning processor to provide information about whether the request is to be blocked or a service connection is to be established on a most optimal route.

The machine learning processor is responsible for two tasks. The first task is to implement an initial learning process based on a simulation model of an actual network and a forecasted traffic load matrix. After initial learning, the machine learning processor may use (5) to (18) to provide a group of initial learning parameters. Based on this, the second task may be performed to determine whether a service connection can be provided and determine a route, and continue to perform online learning based on actual network service request data and network snapshot information, for example, by updating related learning parameters in (5) to (18).

The machine learning processor feeds back decision information to the central controller in the network. The central controller triggers the required signaling to establish a service connection. In addition, information of a current network snapshot and a service connection is further sent to a network status database to store historical status information of the network. With the accumulation of this information, the machine learning processor will have more actual network status data for learning.

For a machine learning process, in addition to initial offline learning, online learning may also occur in some cases. For example, if in the present invention, it may be predicted that traffic load will change significantly between a pair of nodes in a near future, and this variable may be added to the learning process in the present invention to adjust related learning parameters in (5) to (18). This is completed by considering both data that is generated in the simulation and actual network status information data that is stored in the network status database. Similarly, if the number of network link capacity increases, the present invention needs to implement a similar learning process to update those related learning parameters. Because the machine learning processor needs to perform learning based on the network status information data that is based on simulation and is stored in the network state database, to achieve this objective, a parallel computing system is required.

In addition, after the tasks are completed, the present invention needs to consider a possibility of service release. When this case occurs, the central controller instructs a data plane to release related network resources and instructs the machine learning processor to update current network status information. However, for a service release process, the related learning parameters do not need to be updated, and further network snapshots do not need to be forwarded to the network status database for storage.

Figure 3:
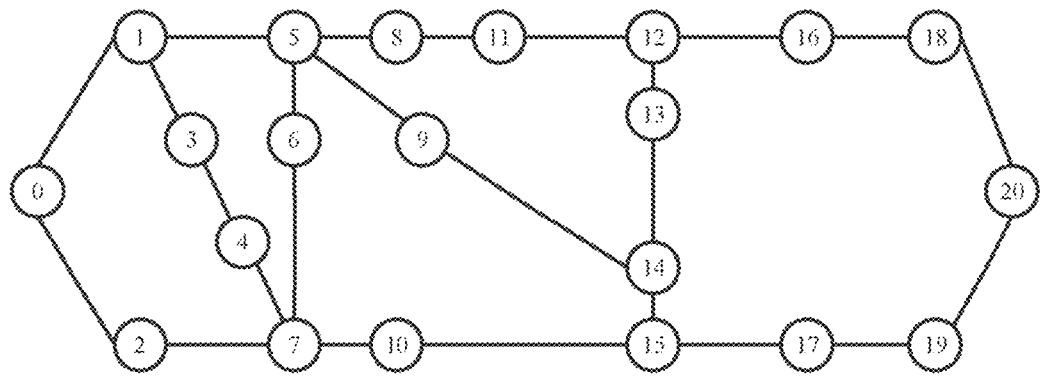
FIG. 3 shows test networks, wherein (a) is a 14-node, 21-link NSFNET network, and (b) is a 21-node, 25-link ARPA-2 network.
Figure 3:
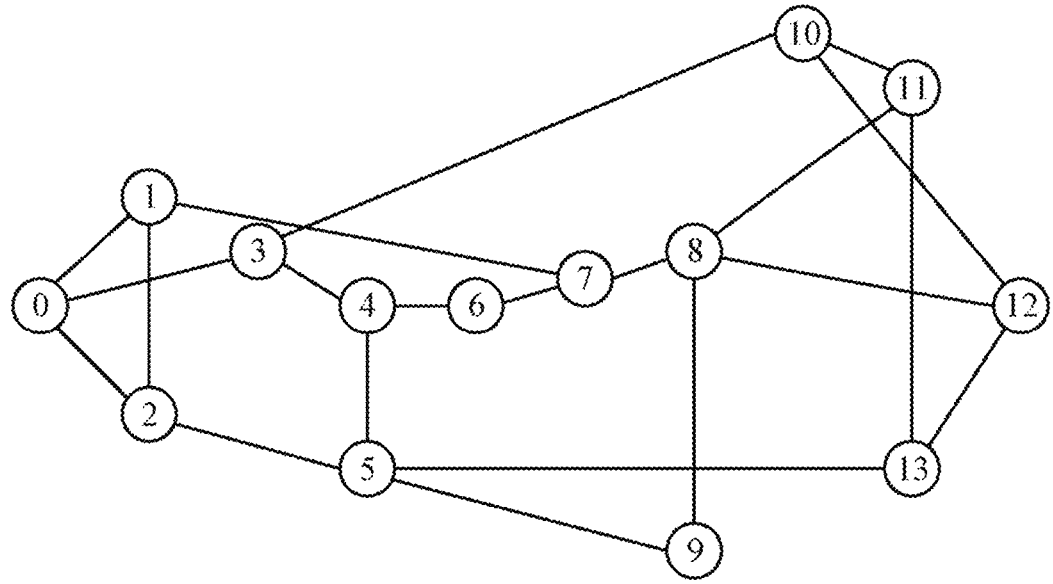

In the present invention, it is assumed that service connection requests that newly arrive follow a Poisson distribution, and an arrival rate is λ connections per second. The average duration of each service connection request follows exponential distribution and is 1/μ second. 1/μ=1 is used to normalize time statistics in the present invention, and traffic load between each pair of nodes may be considered as λ erlang. Two test networks, namely, (1) a 14-node 21-link NSFNET network and (2) a 21-node 25-link APAR-2 network, as shown in FIG. 3, are considered in the present invention. The number of capacity units on each link in each network is randomly distributed within a particular range, and traffic load between each node pair is randomly generated within a particular range. Specifically, in the NSFNET network, the number of capacity units in each link is randomly distributed within a range [5, 27] units, and traffic load between each node pair is generated within a range [0.45, 0.45+X] erlang, wherein X∈ {0.15, 0.3, ..., 1.05}). In the ARPA-2 network, the number of capacity units in each link is randomly distributed within a range [5, 31] units, and traffic load between each node pair is generated within a range [0.07, 0.07+X]erlang, wherein X ∈ {0.07, 0.14, ..., 0.49}.

Each blocking probability point in a shortest-path routing algorithm and a conventional least-loaded routing algorithm is assessed according to arrival events of $10^6$ service connection requests.

For the naive Bayes classifier-assisted least-loaded routing algorithm, the present invention uses a parallel computing system to operate dynamic event simulation in which the number of service requests is $10^8$. Between each node pair, all conforming candidate routes are considered in the algorithm for route selection according to the current network link capacity status. The present invention uses a parallel computing system that includes ten small computers to operate a simulation and learning process, where one computer is used as both a cluster controller and a cluster computer, and the remaining 9 small computers are all used as cluster computers. Each small computer has one 4.0 GHz quad-core CPU and one 8 GB memory. Ten rounds of sub-learning processes are executed to simulate 10,000,000 service arrival events. Each computer simulates 1,000,000 service arrival events. Based on $10^8$ call arrival requests, an overall blocking probability of the naive Bayes classifier-assisted least-loaded routing algorithm is calculated.

Figure 4:
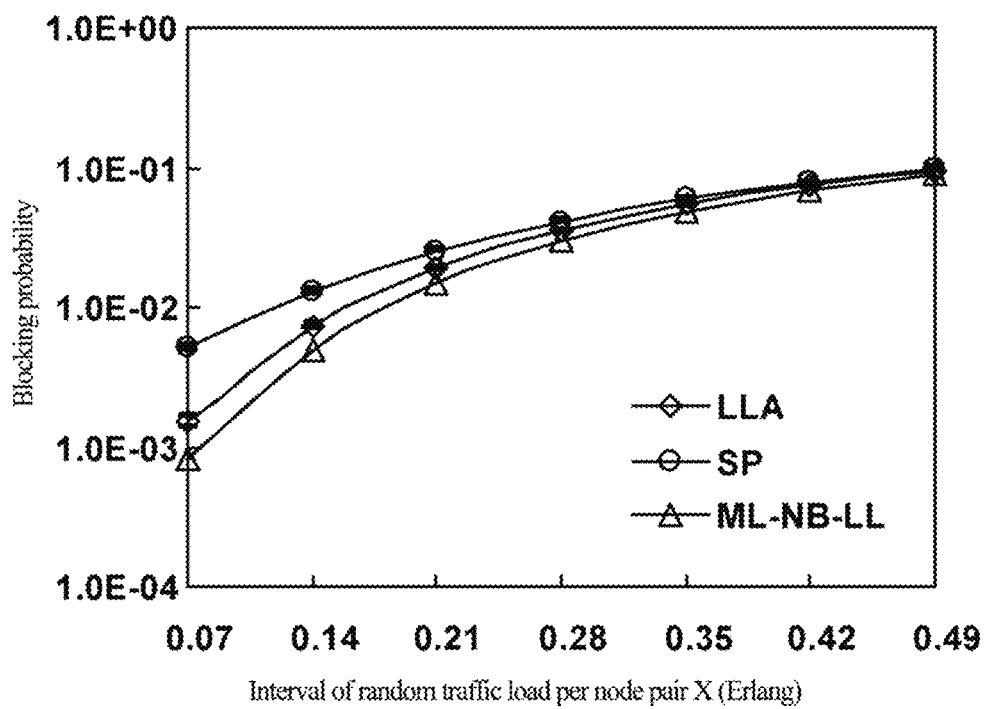
FIG. 4 shows blocking performance comparison between the three algorithms, wherein (a) is an NSFNET network, and (b) is an ARPA-2 network.
Figure 4:
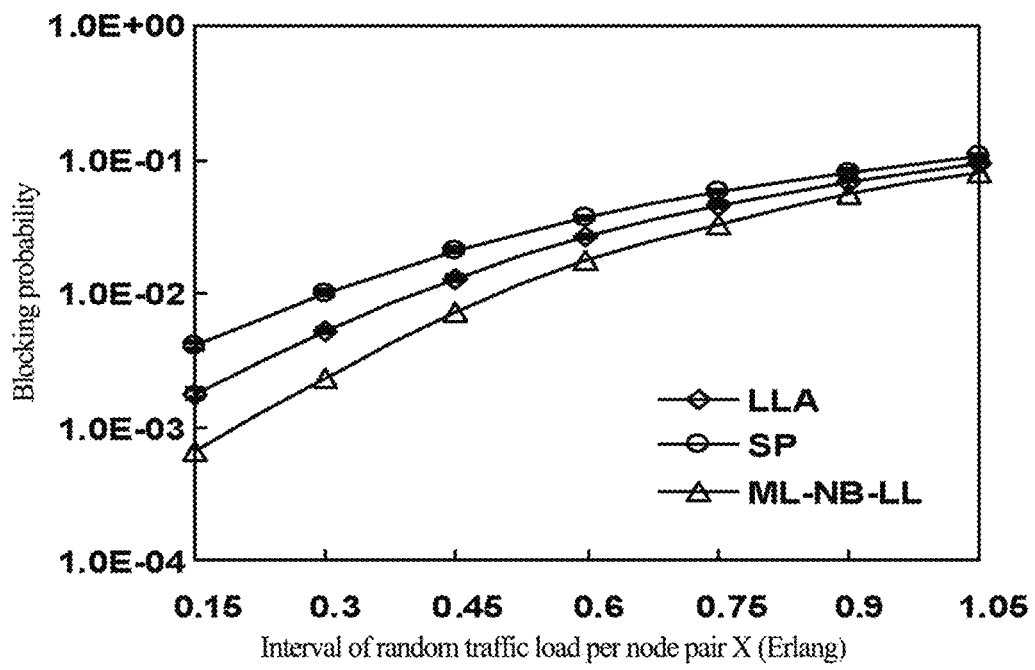

In the present invention, service connection blocking performance of different algorithms is first compared. FIG. 4 shows an increased blocking probability of traffic load between each node pair in the NSFNET network and the ARPA-2 network. In the drawing, "LLA" corresponds to the conventional least-loaded routing algorithm, "SP" corresponds to a shortest-path routing algorithm, and "ML-NB-LL" corresponds to a naive Bayes classifier-assisted least-loaded routing algorithm.

FIG. 4(a) shows the results of a shortest-path routing algorithm and a conventional least-loaded routing algorithm for an NSFNET network that is based on Student-t distribution with 95% confidence interval. For the naive Bayes classifier-assisted least-loaded routing algorithm, because there is a massive quantity of network snapshots ($10^8$ service arrival requests) in learning, the present invention does not show a confidence interval of the NSFNET network. It may be seen that the naive Bayes classifier-assisted least-loaded routing algorithm shows the highest blocking performance in all three routing algorithms, followed by the conventional least-loaded routing algorithm, and then by the shortest-path routing algorithm. Considering the load balancing of an entire network, the conventional least-loaded routing algorithm always chooses a lightly loaded route that also has the least adverse impact on service connection establishments in the future, if a service connection is indeed established on this route. Therefore, the performance of the conventional least-loaded routing algorithm is better than that of the shortest-path routing algorithm. In addition, the performance of the naive Bayes classifier-assisted least-loaded routing algorithm is better than that of the conventional least-loaded routing algorithm, because the naive Bayes classifier-assisted least-loaded routing algorithm further considers, in addition to traffic load on each route, the potential blocking probability of the entire network during establishment of a future service connection based on historical service request data when a service connection is established on a route. By learning from this historical data, if a service connection is established on this route, the algorithm selects a route having a relatively light load, and the route also has a lowest negative impact on the successful establishment of a future service connection. In the ARPA-2 network, the three algorithms show similar performance.

Figure 5:
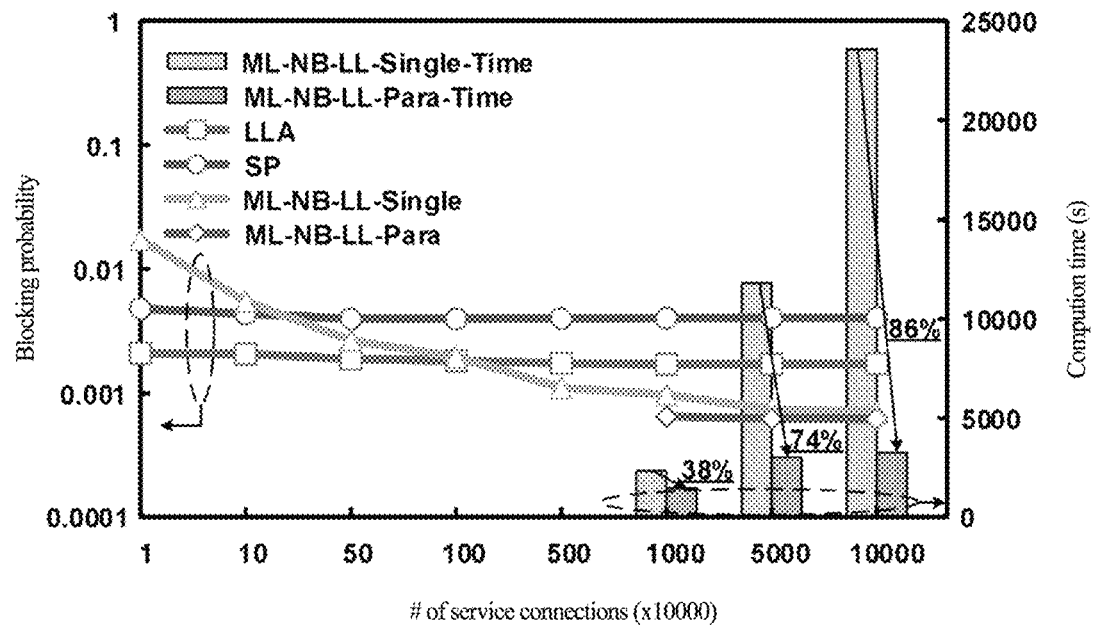
FIG. 5 shows blocking performance and computing time comparison between the different routing algorithms under different numbers of network snapshots learned, wherein (a) is an NSFNET network, and (b) is an ARPA-2 network.
Figure 5:
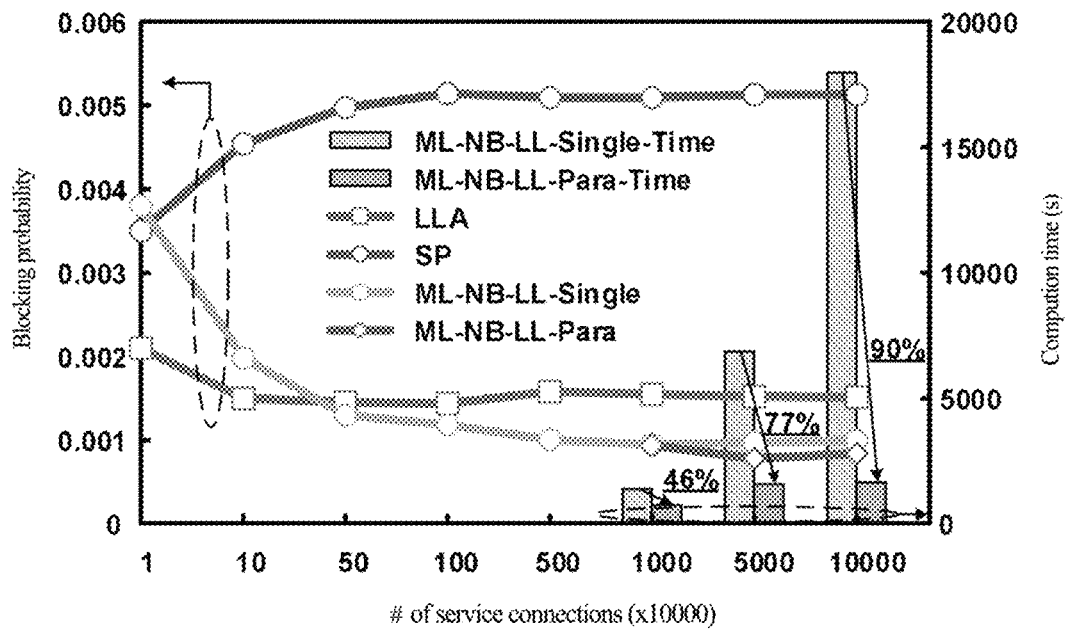

Network snapshot learning is an important step for ensuring the desired performance of the naive Bayes classifier-assisted routing algorithm. Therefore, in the present invention, how the number of network snapshots in learning (the number is equal to the number of service requests that arrive) affects blocking performance of a service connection is also assessed. Results are shown in FIG. 5, where the figure legend "Single" corresponds to a simulation of a single computer, the figure legend "Para" corresponds to parallel computing, and the figure legend "Time" corresponds to a time required to process a particular number of arrival events.

In the NSFNET network, the traffic load between each node pair is randomly generated within a range [0.45, 0.6] erlang, and the total number of capacity units in each link is randomly distributed within a range [5, 27] units. For the least-loaded routing algorithm and the shortest-path routing algorithm, because there is no learning process, the blocking performance of the least-loaded routing algorithm and the blocking performance of the shortest-path routing algorithm become stable after a million service connections have arrived. However, for the naive Bayes classifier-assisted least-loaded routing algorithm, as the number of service connection requests increases, the blocking performance is improved, and no longer changes when the number of service connection requests reaches 50,000,000. In addition, the eventual blocking performance of the naive Bayes classifier-assisted least-loaded routing algorithm is better than the eventual blocking performance of the other two routing algorithms.

In addition, particularly for the naive Bayes classifier-assisted least-loaded routing algorithm, up to 100,000,000 arrival events need to be simulated, and this consumes excessive time for a single computer. Therefore, a parallel computing system is used to perform the simulation. In FIG. 5(a), in the present invention, a time consumed by a single computer is compared with a time consumed by the parallel computing system. It may be seen in the present invention that the parallel computing system can greatly shorten a simulation time. For example, for simulation of 100,000,000 arrival events, a calculation time of using the parallel computing system can reduce the time of nearly 7 hours to about 1 hour, and the reduction exceeds 85%. This shows the computing efficiency of the parallel computing system in a machine learning process. It should be noted that because the system in the present invention can be easily extended, in the future, the present invention can further increase the number of computers in the parallel computing system, and even the calculation time can be shortened.

In the present invention, similar simulation research is performed on the ARPA-2 network. The traffic load between each node pair is randomly generated within a range [0.07, 0.14] erlang, and the total number of capacity units in each link is randomly distributed within a range [5, 31]. As shown in FIG. 5(b), the blocking performance and calculation time in different solutions are similar to the blocking performance and calculation time of the NSFNET network. Here, for the naive Bayes classifier-assisted least-loaded routing algorithm, when 10,000,000 arrival events are simulated, the blocking performance hardly changes. In addition, the performance of the naive Bayes classifier-assisted least-loaded routing algorithm may be always higher than the performance of the other two routing algorithms. For a machine learning process, it may be seen in the present invention that the parallel computing system may help to reduce the calculation time by 90%.

Figure 6:
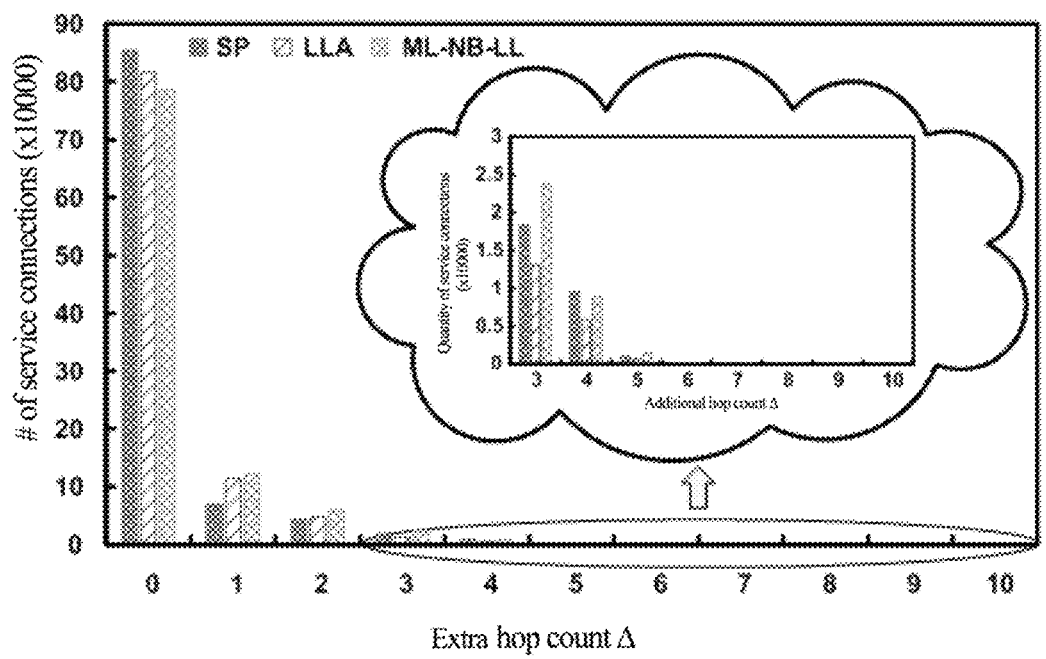
FIG. 6 shows extra hop count distributions of the different routing algorithms, wherein (a) is NSFNET (average numbers of extra hops=0.2576 (SP), 0.2781 (LLA), and 0.2194 (ML-NB-LL)), and (b) is ARPA-2 (average numbers of extra hops=0.1602 (SP), 0.3942 (LLA), and 0.3575 (MB-NB-LL))
Figure 6:
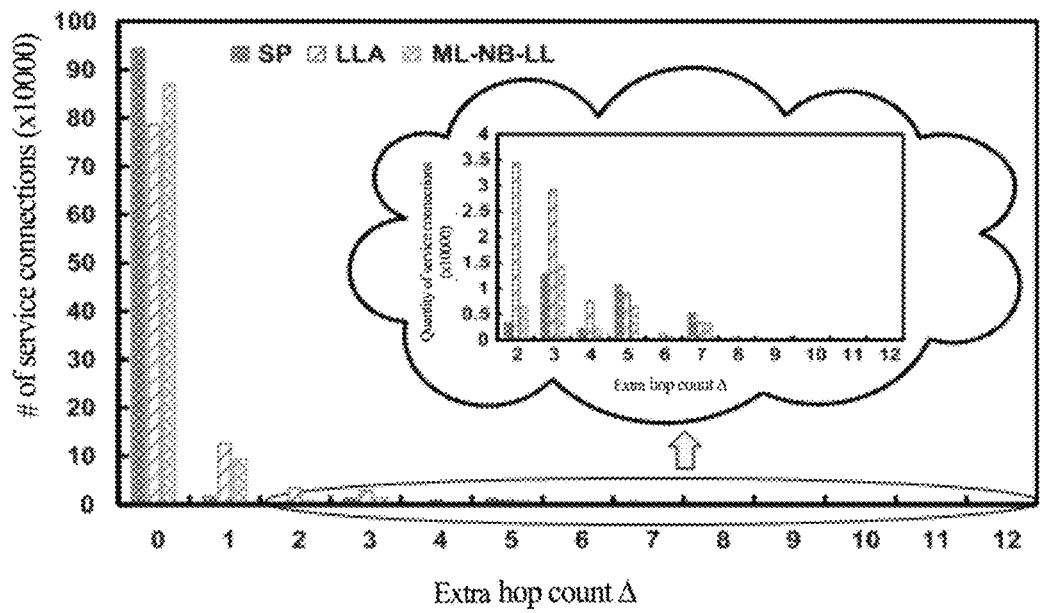

In FIG. 6, the present invention shows extra hop count of a route on which a service connection has been established as compared with the shortest route. For example, the shortest route on which a service connection is established between a node pair (based on a physical topology) has K hops. However, considering the network resource usage status, an eventual route of a least-loaded routing algorithm is not the shortest, and is a longer route instead. Here, the number of hop count $\Delta$ is a hop count greater than K and is defined as the extra hop count as compared with the shortest route between the node pair. The hop count of the eventually selected route is K+$\Delta$.

Therefore, in FIG. 6, $\Delta=0$ denotes the case of the shortest route, and $\Delta>0$ denotes that the selected route is longer than the shortest route. Extra hop count distribution of established service connections in the shortest-path routing algorithm, the conventional least-loaded routing algorithm, and the naive Bayes classifier-assisted least-loaded routing algorithm are compared. For the shortest-path routing algorithm and the conventional least-loaded routing algorithm, only $10^6$ arrival requests are simulated, and the reason is that with the number of service requests increasing, the blocking probability may eventually become stable. For the naive Bayes classifier-assisted least-loaded routing algorithm, $10^8$ arrival requests are simulated, and the foregoing data distribution of the last $10^6$ arrival requests is collected.

Figure 7:
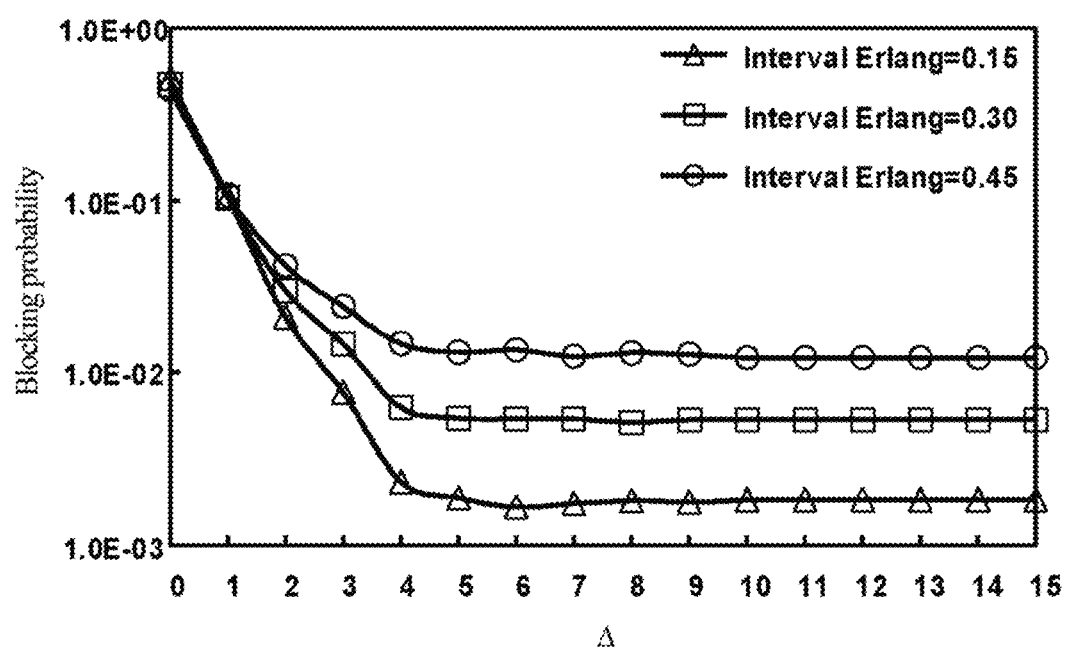
FIG. 7 shows the blocking probability versus hop count limit for a least-loaded route (NSFNET), wherein Δ is the difference between hop count of a least-loaded route and the count of the shortest route between each node pair.

According to the results of FIG. 6, most of the service connections are established on the shortest route, that is, $\Delta=0$. However, large percentages of service connections are also established on the second shortest route and a third shortest route. In some cases, in the conventional least-loaded routing algorithm, a long route whose $\Delta=10$ is selected, because this algorithm considers only a least congested route and ignores an actual hop count of a selected route. Certainly, the conventional least-loaded routing algorithm may also partially consider a hop count weighted by the link capacity utilization in a default case. Average extra hop counts of establishing service connections in the three routing algorithms are calculated (referring to FIG. 4). It may be found that in the NSFNET network, as compared with the other two routing algorithms, the naive Bayes classifier-assisted least-loaded routing algorithm shows the smallest extra hop count. This means that during the implementation of the least-loaded routing algorithm, the naive Bayes classifier-assisted least-loaded routing algorithm has the lowest over-consumption of network resources, so as to implement a relatively low overall blocking probability. The same comparison may be performed for the ARPA-2 network, and a similar phenomenon may be observed. Most of the service connections are established on the shortest route, a second shortest route, and a third shortest route between a node pair. The shortest-path routing algorithm has the smallest extra hop counts. When two least-loaded routing algorithms are compared, the naive Bayes classifier-assisted least-loaded routing algorithm has a smaller extra hop counts. This means that less network capacity is wasted when a least-loaded route is selected as compared with the conventional least-loaded routing algorithm. Based on these results, such a conclusion may be reached in the present invention: in the naive Bayes classifier-assisted least-loaded routing algorithm, the extra hop counts of a route has already been desirably controlled during route selection, so as to avoid over-consumption of network capacity. Therefore, as shown in FIG. 7, the present invention significantly reduces the blocking probability of a service connection.

In the present invention, a conventional least-loaded routing algorithm is extended, and the extra hop count is introduced to the algorithm as a constraint during a search in a network for a least-loaded route. In the present invention, various extra hop counts shown in FIG. 7 are used to show related results of blocking performance. Considering the NSFNET network, the total number of capacity units on each link is randomly distributed within a range [5, 27] units, and traffic load between each node pair is randomly generated within a range [0.45, 045+X] erlang, wherein X is the traffic load interval between different node pairs. As can be seen from the results, as the extra hop count relative to the shortest route increases, light path blocking performance is improved right at the beginning. However, after the extra hop count reaches a threshold, the light path blocking performance no longer changes. More specifically, after the extra hop count increases to 4, a further increase of this parameter no longer causes the blocking performance to improve. When the extra hop count becomes infinitely large, the algorithm turns into a complete version of the conventional least-loaded routing algorithm. This shows that when only extra hop counts between all node pairs are simply controlled, blocking performance of the conventional least-loaded routing algorithm cannot be improved. In contrast, this method for controlling the extra hop count is different from a method in which the naive Bayes classifier-assisted least-loaded routing algorithm controls the extra hop count according to the current network status.

The foregoing description is merely preferred implementations of the present invention, and is not used to limit the present invention. It should be noted that a person of ordinary skill in the art may still make several improvements and variations without departing from the technical principle of the present invention, and these improvements and variations shall be considered as falling within the protection scope of the present invention.

What is claimed is:

1. A method for selecting a least-loaded route based on a naive Bayes classifier, comprising:
   finding candidate routes between a node pair sd when a service connection is established and placing the candidate routes in a set $R^{sd}$;
   when a service connection is to be established on each candidate route between a pair of nodes, calculating the sum load of each candidate route according to the current network capacity utilization status, and operating a naive Bayes classifier to predict the future potential connection blocking probability of an entire network if a service connection is established along the route; and
   choosing a route with the least load as well as having the lowest impact on the success of future service connection establishment based on the following equation:

$$R_{sd}^* = \underset{k}{\mathrm{argmin}}\left(BP_{net}^{sd,k} \cdot u_k^{sd}\right)$$

wherein $R_{sd}^*$ is a route with the least load as well as having the lowest impact on the success of future service connection establishment between the node pair sd, $BP_{net}^{sd,k}$ is a future potential network-wide blocking probability when a service connection is established on a candidate route $r_k^{sd}$ between a pair of nodes sd, and $u_k^{sd}$ is a sum load of the candidate route $r_k^{sd}$.

2. The method for selecting a least-loaded route based on a naive Bayes classifier according to claim 1, wherein said "operating a naive Bayes classifier to predict the future potential connection blocking probability of an entire network if a service connection is established along the route" comprises:
   whenever a new service request between a pair of nodes arrives, recording the current network link capacity status as a network snapshot, with time, a sequence of network snapshots is formed, the network snapshot is denoted by a vector as follows:

$$S^{(i)}=[U_1^{(i)}, \ldots, U_j^{(i)}, \ldots, U_L^{(i)}]^T$$

wherein, superscript i denotes an $i^{th}$ network snapshot, which the one when the $i^{th}$ service connection request arrives, L is the total number of network links, and $U_j^{(i)}$ is the total number of capacity units used on link j, $U_j^{(i)}$ can be considered as a feature $x_j$ in vector X;
   for each candidate route $r_k^{sd} \in R^{sd}$, it is used to establish a service connection, after which a network snapshot $S_c$ would be updated to:

$$S_k=S_c+r_k^{sd}$$

after a service connection is established along $r_k^{sd}$ based on the network snapshot $S_k$, estimating the potential service blocking probability between a node pair s'd' as:

$$BP_{s'd'}^{sd,k}=P(Y=1|S_k, s'd')$$

after a service connection is established along $r_k^{sd}$, calculating a network-wide blocking probability as:

$$Bp_{net}^{sd,k}=\Sigma_{s'd'}l_{s'd'} \cdot BP_{s'd'}^{sd,k}$$

wherein, $l_{s'd'}$, is the ratio of traffic load between node pair s'd' to the total traffic in the entire network, the relationship $\Sigma_{s'd'}l_{s'd'}=1$ holds, and $l_{s'd'}$ is calculated as:

$$l_{s'd'} = \frac{\sum_{i=1}^{H} I\{s'd'^{(i)} = s'd'\}}{H}$$

wherein $I\{s'd'^{(i)}=s'd'\}$ is an indicator function to tell if the $i^{th}$ service request is initiated by node pair s'd', and if it is, value of the indicator function is 1, or otherwise value of the indicator function is 0; and
   said "calculating the sum load of each candidate route" includes:
   for each candidate route $r_k^{sd} \in R^{sd}$, calculating their sum load on their traversed links, wherein the sum load is calculated as:

$$u_k^{sd}=\Sigma_{i\in r_k^{sd}}u_{k,i}^{sd}$$

wherein $u_{k,i}^{sd}$ is capacity utilization on the $i^{th}$ link of route $r_k^{sd}$, and is defined as:

$$u_{k,i}^{sd} = \frac{U_i^c}{W_i}$$

wherein $W_i$ is the number of total capacity units on link i, $U_i^c$ is the number of capacity units used on link i in the network snapshot $S_c$, and $u_k^{sd}$ is the sum load of a candidate route.

3. The method for selecting a least-loaded route based on a naive Bayes classifier according to claim 2, wherein a specific calculation method of predicting a potential blocking probability by using the naive Bayes classifier includes: defining a network snapshot and an index of the node pair requesting a service connection as problem instances of the naive Bayes classifier, where a mathematical expression is:

$$X=[S, sd]^T$$

wherein, S denotes a network snapshot, sd is an index of the node pair requesting a service connection and is a feature of the problem instance. This new request may be either established or declined depending on the current network capacity utilization, let a binary variable Y denote the outcome of the classifier when it is given the input X, Y=0 if the service request between sd is served; otherwise, Y=1 if the service request between sd is blocked, and defining a conditional probability $P(Y=1|X)=P(Y=1|<S, sd>)$ as a potential blocking probability of a service request between node pair sd based on the current network snapshot S. Using Bayes' theorem, this conditional probability can be written as:

$$P(Y=1 \mid X) = \frac{P(Y=1) \cdot P(X \mid Y=1)}{P(X)}$$

for a circuit-switched network where connection requests arrive dynamically, P(Y=1) denotes the overall network-wide blocking probability of the service requests that have arrived:

$$P(Y=1) = \frac{\sum_{i=1}^{H} I\{Y^{(i)} = 1\}}{H}$$

wherein H is the total number of service requests that have arrived, $I\{Y^{(i)}=1\}$ is an indicator function, which is 1 if the $i^{th}$ arrived request is blocked, and which otherwise is 0;

P(X|Y=1) is the probability of finding the network in state S with a request initiated between node pair sd given that the service request is blocked. Using suitable independence assumptions, this may be expanded as follows:

$$P(X|Y=1)=P(S|Y=1) \cdot P(sd|Y=1)=\Pi_{j=1}^{L} P(U_j=U_j^s|Y=1) \cdot P(sd|Y=1)$$

where capacity usage on the links are independent of each other, and that they are also independent of the node pair that initiates the request. $U_j^s$ is the number of capacity units used on link j in the network snapshot S, and $P(U_j=U_j^s|Y=1)$ is the probability that the number of capacity units used on link j is equal to $U_j^s$ when a service request is blocked, We can now calculate $P(U_j=U_j^s|Y=1)$ and $P(sd|Y=1)$ using the following two equations:

$$P(U_j = U_j^S \mid Y = 1) = \frac{\sum_{i=1}^{H} I\{U_j^{(i)} = U_j^S \land Y^{(i)} = 1\}}{\sum_{i=1}^{H} I\{Y^{(i)} = 1\}}$$

$$P(sd \mid Y = 1) = \frac{\sum_{i=1}^{H} I\{sd^{(i)} = sd \land Y^{(i)} = 1\}}{\sum_{i=1}^{H} I\{Y^{(i)} = 1\}}$$

wherein, $I\{U_j^{(i)}=U_j^s \land Y^{(i)}=1\}$ is an indicator function, which is equal to 1 if the $i^{th}$ service request is blocked and the number of capacity units used on link j is equal to $U_j^s$, or which otherwise is equal to 0; and $I\{sd^{(i)}=sd \land Y^{(i)}=1\}$ is an indicator function, which is equal to 1 if the $i^{th}$ service request is initiated by node pair sd and it is blocked, or which otherwise is equal to 0; and P(X) is derived as follows:

$$P(X)=P(S, sd)=P(S) \cdot P(sd)=\Pi_{j=1}^{L} P(U_j=U_j^s) \cdot P(sd)$$

wherein $P(U_j=U_j^s)$ and P(sd) are calculated as follows:

$$P(U_j = U_j^S) = \frac{\sum_{i=1}^{H} I\{U_j^{(i)} = U_j^S\}}{H}$$

$$P(sd) = \frac{\sum_{i=1}^{H} I\{sd^{(i)} = sd\}}{H}$$

wherein $I\{U_j^{(i)}=U_j^s\}$ is an indicator function, which is equal to 1 if the number of capacity units used on link j is equal to $U_j^s$ when the $i^{th}$ service request arrives, or which otherwise is equal to 0; and $I\{sd^{(i)}=sd\}$ is an indicator function which is equal to 1 if the $i^{th}$ request is initiated by node pair sd, or which otherwise is equal to 0.

4. The method for selecting a least-loaded route based on a naive Bayes classifier according to claim 1, wherein a parallel algorithm is used to perform operation of the naive Bayes classifier, and a specific method comprises: a cluster controller is responsible for distributing computation tasks to a plurality of cluster computers, and gathering results fed back by the cluster computers, and the computing clients work in parallel and feedback the results of their computation to the cluster controller; and once the cluster controller receives feedback, it will update the total number of blocked events in an entire simulation system and the related parameters by integrating all the feedback information from all the cluster computers.

5. A system for selecting a least-loaded route based on a naive Bayes classifier, comprising:
a unit for establishing a candidate route set, configured to: determine all candidate routes for establishing a service connection between a node pair sd, and place the candidate routes in a set $R^{sd}$;
a unit for calculating a future potential connection blocking probability and sum load of each candidate route, configured to: when a service connection is to be established on each candidate route between a pair of nodes, calculating the sum load of each candidate route according to the current network capacity utilization status, and operating a naive Bayes classifier to predict the future potential connection blocking probability of an entire network if a service connection is established along the route; and a unit for determining a most optimal route, configured to choose a route with the least load as well as having the lowest impact on the success of future service connection establishment if a service connection is established along the route based on the following equation:

$$R_{sd}^* = \underset{k}{\arg\min}\left(BP_{net}^{sd,k} \cdot u_k^{sd}\right)$$

wherein $R_{sd}^*$ is a route with the least load as well as having the lowest impact on the success of future service connection establishment if a service connection is established along the route between the node pair sd, $BP_{net}^{sd,k}$ is a future potential network-wide blocking probability when a service connection is established on a candidate route $r_k^{sd}$ between a pair of nodes sd, and $u_k^{sd}$ is a sum load of the candidate route $r_k^{sd}$.

6. The system for selecting a least-loaded route based on a naive Bayes classifier according to claim 5, further comprising a unit for generating a sequence of network snapshots, configured to record the current network link capacity status, specifically including: whenever a new service request between a pair of nodes arrives, recording the current network link capacity status as a network snapshot, with time, a sequence of network snapshots is formed, the network snapshot is denoted by a vector as follows:

$$S^{(i)}=[U_1^{(i)}, \ldots, U_j^{(i)}, \ldots, U_L^{(i)}]^T$$

wherein, superscript i denotes an $i^{th}$ network snapshot, which the one when the $i^{th}$ service connection request arrives, L is the total number of network links, and $U_j^{(i)}$ is the total number of capacity unitsused on link j, $U_j^{(i)}$ can be considered as a feature $x_j$ in vector X;

the unit for calculating a future potential connection blocking probability and sum load of each candidate route includes a module for calculating a future potential connection blocking probability and a module for calculating sum load of each candidate route, wherein the module for calculating a future potential connection blocking probability is configured to calculate the future potential connection blocking probability of the entire network when each candidate route is used to establish a service connection between a node pair, and a specific calculation process includes:

for each candidate route $r_k^{sd} \in R^{sd}$, if it is used to establish a service connection, a network snapshot $S_c$ would be updated to:

$$S_k = S_c + r_k^{sd}$$

after a service connection is established along $r_k^{sd}$ based on the network snapshot $S_c$, estimating the potential service blocking probability between a node pair s'd' as:

$$BP_{s'd'}^{sd,k}=P(Y=1|>S_k, s'd'>)$$

after a service connection is established along $r_k^{sd}$, calculating a network-wide blocking probability as:

$$BP_{net}^{sd,k}=\Sigma_{s'd'}l_{s'd'}BP_{s'd'}^{sd,k}$$

wherein, $I_{s'd'}$ is the ratio of traffic load between node pair s'd' to the total traffic in the entire network, the relationship $\Sigma_{s'd'}l_{s'd'}=1$ holds, and $l_{s'd'}$ is calculated as:

$$l_{s'd'} = \frac{\sum_{i=1}^{H} I\{s'd'^{(i)} = s'd'\}}{H}$$

wherein $I\{s'd'^{(i)}=s'd'\}$ is an indicator function to tell if the $i^{th}$ service request is initiated by the node pair s'd', and if it is, value of the indicator function is 1, or otherwise value of the indicator function is 0; and the module for calculating sum load of each candidate route is configured to calculate the sum load of a candidate route when the candidate route $r_k^{sd}$ is used to establish a service connection between the node pair sd, wherein the sum load is calculated as:

$$u_k^{sd}=\Sigma_{i\in r_k^{sd}}u_{k,i}^{sd}$$

wherein $u_{k,i}^{sd}$ is capacity utilization on the $i^{th}$ link of the route $r_k^{sd}$, defined as:

$$u_{k,i}^{sd} = \frac{U_i^c}{W_i}$$

wherein $W_i$ is the number of total capacity units on link i, $U_i^c$ is the number of capacity units used on link i in the network snapshot $S_c$, and $u_k^{sd}$ is the sum load of a candidate route.

7. The system for selecting a least-loaded route based on a naive Bayes classifier according to claim 6, wherein the module for calculating a future potential connection blocking probability operates the naive Bayes classifier to predict a future potential connection blocking probability, where a method for operating the naive Bayes classifier includes:

defining a network snapshot and an index of the node pair requesting a service connection as problem instances of the naive Bayes classifier, where a mathematical expression is:

$$X=[S,sd]^T$$

wherein, S denotes a network snapshot, sd is an index of the node pair requesting a service connection and is a feature of the problem instance, this new request may be either established or declined depending on the current network capacity utilization, let a binary variable Y denote the outcome of the classifier when it is given the input X, Y=0 if the call request between sd is served; otherwise, Y=1 if the call request between sd is blocked, and defining a conditional probability P(Y=1|X)=P(Y=1|<S, sd>) as a potential blocking probability of a future service request between node pair sd based on the current network snapshot S, using Bayes' theorem, this conditional probability can be written as:

$$P(Y=1 \mid X) = \frac{P(Y=1) \cdot P(X \mid Y=1)}{P(X)}$$

for a circuit-switched network where connection requests arrive dynamically, P(Y=1) denotes the overall network-wide blocking probability of the service requests that have arrived:

$$P(Y=1) = \frac{\sum_{i=1}^{H} I\{Y^{(i)} = 1\}}{H}$$

wherein H is the total number of service requests that have arrived, $I\{Y^{(i)}=1\}$ is an indicator function, which is 1 if the $i^{th}$ arrived request is blocked, and which otherwise is 0;

$P(X|Y=1)$ is the probability of finding the network in state S with a request initiated between node pair sd given that the service request is blocked, using suitable independence assumptions, this may be expanded as follows:

$P(X|Y=1)=P(S|Y=1) \cdot P(sd|Y=1)=\Pi_{j=1}^{L} P(U_j=U_j^s|Y=1) \cdot P(sd|Y=1)$ wherein the capacity usage on the links are independent of each other, and that they are also independent of the node pair that initiates the request, $U_j^s$ is the number of capacity units used on link j in the network snapshot S, and $P(U_j=U_j^s|Y=1)$ is the probability that the number of capacity units used on link j is equal to $U_j^s$ when a service request is blocked;

$P(U_j=U_j^s|Y=1)$ and $P(sd|Y=1)$ are calculated by using the following two equations:

$$P(U_j = U_j^S | Y = 1) = \frac{\sum_{i=1}^{H} I\{U_j^{(i)} = U_j^S \wedge Y^{(i)} = 1\}}{\sum_{i=1}^{H} I\{Y^{(i)} = 1\}}$$

$$P(sd | Y = 1) = \frac{\sum_{i=1}^{H} I\{sd^{(i)} = sd \wedge Y^{(i)} = 1\}}{\sum_{i=1}^{H} I\{Y^{(i)} = 1\}}$$

wherein, $I\{U_j^{(i)}=U_j^s \wedge Y^{(i)}=1\}$ is an indicator function, which is equal to 1 if the $i^{th}$ service request is blocked and the number of capacity units used on link j is equal to $U_j^s$, and which otherwise is 0, and $I\{sd^{(i)}=sd \wedge Y^{(i)}=1\}$ is an indicator function, which is equal to 1 if the $i^{th}$ service request is initiated by node pair sd and it is blocked, and which otherwise is 0, $P(X)$ is derived as follows:

$P(X)=P(S, sd)=P(S) \cdot P(sd)=\Pi_{j=1}^{L} P(U_j=U_j^s) \cdot P(sd)$ wherein $P(U_j=U_j^s)$ and $P(sd)$ are calculated as follows:

$$P(U_j = U_j^S) = \frac{\sum_{i=1}^{H} I\{U_j^{(i)} = U_j^S\}}{H}$$

$$P(sd) = \frac{\sum_{i=1}^{H} I\{sd^{(i)} = sd\}}{H}$$

wherein $I\{U_j^{(i)}=U_j^s\}$ is an indicator function, which is equal to 1 if the number of capacity units used on link j is equal to $U_j^s$ when the $i^{th}$ service request arrives, and which otherwise is 0; and $I\{sd^{(i)}=sd\}$ is an indicator function which is equal to 1 if the $i^{th}$ request is initiated by node pair sd, and which otherwise is 0.

8. The system for selecting a least-loaded route based on a naive Bayes classifier according to claim 6, wherein a parallel computing system is used to calculate a future potential network-wide blocking probability, which is made up of a cluster controller and cluster computers, and the cluster controller is responsible for distributing the computation tasks to the cluster computers and gathering results fed back by the cluster computers; the cluster computers work in parallel and feedback the results of their computation to the cluster controller, wherein once the cluster controller receives feedback, it will update the total number of blocked events in an entire simulation system and related parameters by integrating all the feedback information from all the cluster computers.

9. The system for selecting a least-loaded route based on a naive Bayes classifier according to claim 8, wherein each sub-learning task executed by the parallel computing system simulates 10 million arrival events, and ten rounds of sub-learning are operated, wherein each time when one round of sub-learnings is completed, the cluster controller will initiate another round of sub-learning process; when doing this, the cluster controller will forward parameters learned based on the previous round to each of the cluster computers, the cluster computer will use these updated parameters to run learning process for another round of arrival events and meanwhile collect the information for updating the related parameters, the entire learning process will terminate when the total number of planned learned events are reached, then the cluster controller will find final service connection blocking probability and final updated parameters.

* * * * *